US010474892B2

(12) United States Patent
Kim et al.

(10) Patent No.: US 10,474,892 B2
(45) Date of Patent: Nov. 12, 2019

(54) MOBILE TERMINAL AND CONTROL METHOD THEREFOR

(71) Applicant: LG ELECTRONICS INC., Seoul (KR)

(72) Inventors: Sangyong Kim, Seoul (KR); Eunyoung Park, Seoul (KR); Seungyong Lee, Seoul (KR); Seungbum Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/575,796

(22) PCT Filed: Jul. 10, 2015

(86) PCT No.: PCT/KR2015/007204
§ 371 (c)(1),
(2) Date: Nov. 20, 2017

(87) PCT Pub. No.: WO2016/190484
PCT Pub. Date: Dec. 1, 2016

(65) Prior Publication Data
US 2018/0144192 A1      May 24, 2018

(30) Foreign Application Priority Data

May 26, 2015 (KR) .................. 10-2015-0073132
May 26, 2015 (KR) .................. 10-2015-0073137

(51) Int. Cl.
*G06K 9/00* (2006.01)
*G06F 21/32* (2013.01)
(Continued)

(52) U.S. Cl.
CPC ......... *G06K 9/00604* (2013.01); *G06F 21/32* (2013.01); *H04N 5/23219* (2013.01);
(Continued)

(58) Field of Classification Search
CPC .................. G06F 21/32; G06K 9/00604; G06K 9/00912; H04N 5/23219; H04N 5/232939
(Continued)

(56) References Cited

U.S. PATENT DOCUMENTS 8,363,146 B2 * 1/2013 Yoshida ............. H04N 5/23219
348/333.12
2010/0316263 A1    12/2010 Hamza
(Continued)

FOREIGN PATENT DOCUMENTS

JP    2008-033681    2/2008
JP    2009-211597    9/2009
(Continued)

OTHER PUBLICATIONS

English Translation of Japanese Patent No. 2008-033681, pp. 1-17. (Year: 2008).*

(Continued)

*Primary Examiner* — Daniel G Mariam
(74) *Attorney, Agent, or Firm* — Lee, Hong, Degerman, Kang & Waimey

(57) ABSTRACT

The present invention relates to a mobile terminal having an image capturing function and a control method therefor. The mobile terminal according to one embodiment of the present invention comprises: a camera; a display unit for outputting images received through the camera; and a control unit for outputting the images to a part of an output area of the display unit and controlling the display unit such that the images are outputted in a preset manner, wherein the control unit outputs the image in a region other than a region in which the image is outputted during the capturing on the basis of capturing of the images, such that different images related to an iris are captured.

10 Claims, 17 Drawing Sheets

(51) Int. Cl.
*H04N 5/232* (2006.01)
*H04M 1/725* (2006.01)

(52) U.S. Cl.
CPC ..... *H04N 5/23222* (2013.01); *H04N 5/23293* (2013.01); *H04N 5/232935* (2018.08); *H04N 5/232939* (2018.08); *H04M 1/72522* (2013.01); *H04M 2250/52* (2013.01)

(58) Field of Classification Search
USPC ........................................................ 382/117
See application file for complete search history.

(56) References Cited

U.S. PATENT DOCUMENTS

| | | | | |
|---|---|---|---|---|
| 2013/0088583 | A1* | 4/2013 | Northcott | G06K 9/00604 348/78 |
| 2015/0302252 | A1* | 10/2015 | Herrera | G06K 9/00617 382/117 |
| 2016/0092720 | A1* | 3/2016 | Lee | G06K 9/00604 348/78 |
| 2016/0125221 | A1* | 5/2016 | Kim | G06K 9/00912 382/117 |
| 2016/0232399 | A1* | 8/2016 | Kempinski | G06K 9/0061 |

FOREIGN PATENT DOCUMENTS

| | | |
|---|---|---|
| JP | 2013518319 | 5/2013 |
| KR | 10-2010-0069028 | 6/2010 |

OTHER PUBLICATIONS

PCT International Application No. PCT/KR2015/007204, International Search Report dated Mar. 28, 2016, 2 pages.

\* cited by examiner

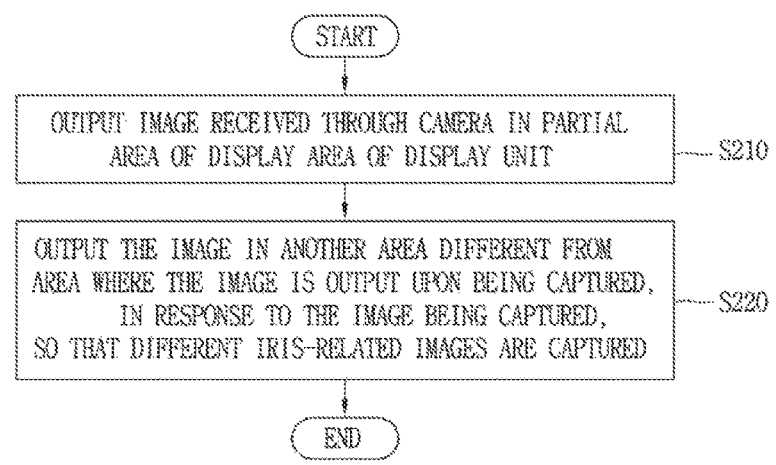
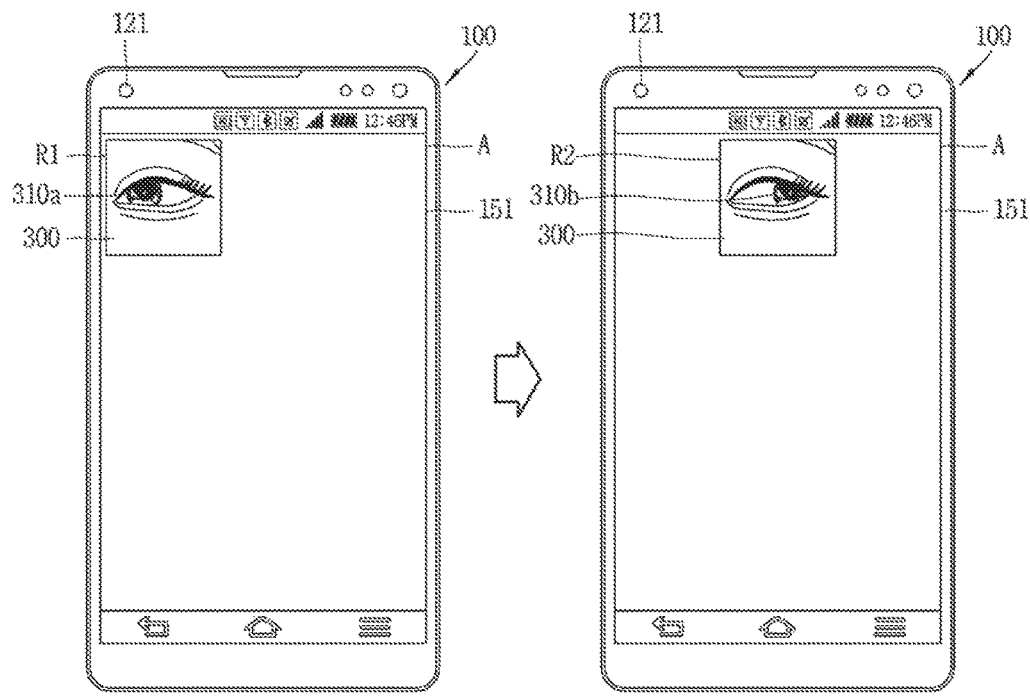

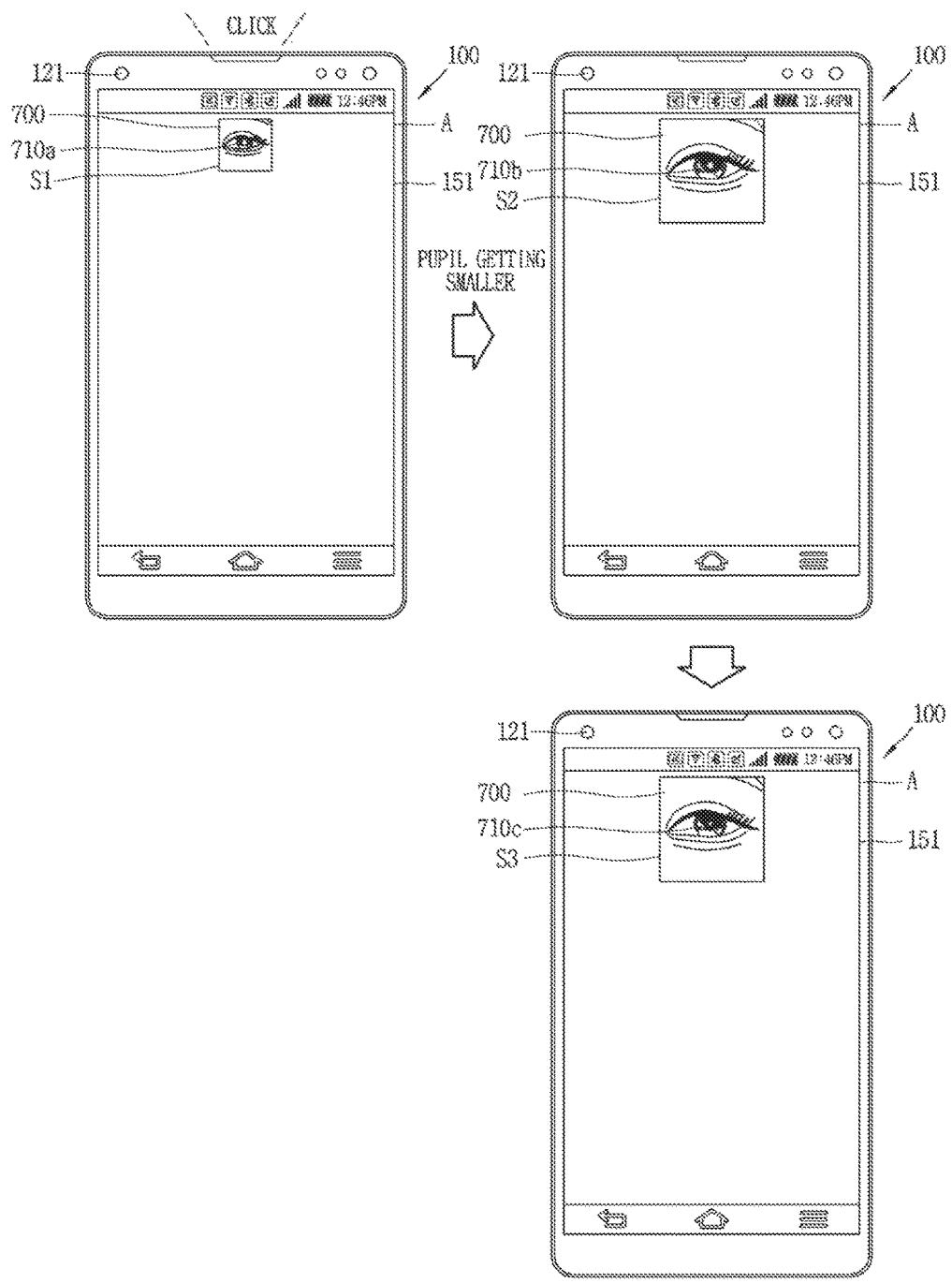

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/007204, filed on Jul. 10, 2015, which claims the benefit of earlier filing date and right of priority to Korean Application Nos. 10-2015-0073132, filed on May 26, 2015, and 10-2015-0073137, filed on May 26, 2015, the contents of which are all hereby incorporated by reference herein in their entirety.

TECHNICAL FIELD

The present invention relates to a mobile terminal having an image capturing function and a control method therefor.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, with development of terminals, various authentication methods for authenticating a user of a terminal have been applied to such terminals. For example, user authentication may be executed using biometric information, and the biometric information may include fingerprint information, iris information, and the like.

Meanwhile, when the user is authenticated by iris recognition (iris recognition or iris authentication), an authentication rate (or an iris recognition rate) is affected by various factors such as a performance of a camera, surrounding environments, and the like. Accordingly, in recent years, various user interfaces (UIs)/user experiences (UXs) for improving the user authentication rate through the iris recognition are increasingly needed.

DISCLOSURE OF THE INVENTION

One aspect of the present invention is to provide a mobile terminal capable of performing an iris recognition function and a control method thereof.

Another aspect of the present invention is to provide a mobile terminal capable of improving an authentication rate of user authentication through iris recognition, and a control method thereof.

Another aspect of the present invention is to provide a mobile terminal capable of capturing an iris-related image used for iris recognition (or iris scanning) in an optimized manner, and a control method thereof.

To achieve these and other advantages and in accordance with the purpose of this specification, as embodied and broadly described herein, there is provided a mobile terminal including a camera, a display unit configured to output an image received through the camera, and a controller configured to output the image in a partial area of a display area of the display unit and control the display unit to output the image in a preset manner, wherein the controller outputs the image in an area different from an area in which the image has been output upon being captured, in response to the image being captured, such that different iris-related images are captured.

In an embodiment disclosed herein, the controller may output the image in a second area different from a first area when the image is captured in a state where the image is output in the first area.

In an embodiment disclosed herein, an output size of the image may be constantly maintained even if the output area of the image is changed.

In an embodiment disclosed herein, the capturing may be performed in response to an iris-related image being recognized in the image.

In an embodiment disclosed herein, the controller may perform the capturing, in response to the output of the iris-related image being maintained for a preset time while the iris-related image is output in the image.

In an embodiment disclosed herein, the controller may output the image in another area, other than capturing the image, when the iris-related image recognized in the image satisfies a preset condition.

In an embodiment disclosed herein, the preset condition may be a case where brightness of at least part of the iris-related image is higher than reference brightness.

In an embodiment disclosed herein, the controller may output the image in a second output size different from a first output size when the image is captured while the image is output in the first output size.

A method for controlling a mobile terminal in accordance with one embodiment of the present invention may include outputting an image received through a camera in a partial area of a display area of a display unit, and controlling the display unit to output the image in a preset manner. Here, the controlling may be configured to output the image in an area different from an area in which the image has been output upon being captured, in response to the image being captured, such that different iris-related images are captured.

In an embodiment disclosed herein, the controlling may be configured to output the image in a second area different from a first area when the image is captured in a state that the image is output in the first area.

A mobile terminal according to another embodiment of the present invention may include a main body, a camera provided in the main body, a display unit provided on a front surface of the main body and configured to output an image received through the camera, a sensing unit configured to sense a posture of the main body, and a controller configured to capture the image, in response to the main body being tilted by a preset tilt, in a state where an iris-related image is output in the image.

In an embodiment disclosed herein, the controller may capture the image, in response to the main body being tilted by a preset first tilt, and then capture the image in response to the main body being tilted by a preset second tilt different from the first tilt, such that different iris-related images are captured.

In an embodiment disclosed herein, the capturing may be performed every time the main body is tilted to correspond to preset tilts.

In an embodiment disclosed herein, the capturing may be performed on the assumption that the iris-related image is output in the image.

In an embodiment disclosed herein, the controller may capture the image when the main body is maintained for a preset time in a state of being tilted to correspond to the preset tilt, while the iris-related image is output in the image.

In an embodiment disclosed herein, the controller may output notification information for notifying conditions necessary for performing the capturing, other than capturing the image, when the iris-related image is not output in the image or a movement of the main body is detected, even though the main body is tilted to correspond to the preset tilt.

In an embodiment disclosed herein, the image may be output in a partial area of a display area of the display unit.

In an embodiment disclosed herein, an output position of the image may be maintained even though the main body is tilted.

In an embodiment disclosed herein, the controller may control the display unit to output a graphic object for guiding a tilted degree of the main body.

In an embodiment disclosed herein, a guide image for guiding a position where the iris-related image is to be output may overlap the image.

In an embodiment disclosed herein, the controller may capture the image, in response to the iris-related image being aligned with the guide image.

In an embodiment disclosed herein, the controller may change at least one of an output size and an output angle of the guide image, in response to the image being captured, so that different iris-related images are captured.

A method for controlling a mobile terminal in accordance with another embodiment of the present invention may include outputting an image received through a camera on a display unit, and capturing the image, in response to a main body being tilted by a preset tilt, in a state where an iris-related image is output in the image.

In an embodiment disclosed herein, the capturing may be configured to capture the image in response to the main body being tilted by a preset first tilt, and then capture the image in response to the main body being tilted by a preset second tilt different from the first tilt, such that different iris-related images are captured.

In an embodiment disclosed herein, the capturing may be performed every time the main body is tilted to correspond to preset tilts.

Advantageous Effects

The present invention can capture a plurality of iris-related images used for iris recognition, and the plurality of iris-related images can be different from one another. Accordingly, the present invention can improve an iris recognition rate by performing the iris recognition using such different iris-related images.

In addition, the present invention can provide UIs/UXs capable of capturing different iris-related images in an optimized manner.

BRIEF DESCRIPTION OF THE DRAWINGS

FIG. 2 is a flowchart illustrating a representative control method in accordance with one embodiment of the present invention.

FIG. 3 is a conceptual view illustrating the control method illustrated in FIG. 2.

FIGS. 6A, 6B and 7 are conceptual views illustrating a method of acquiring different iris-related images.

BEST MODE OF THE INVENTION

Figure 1A:
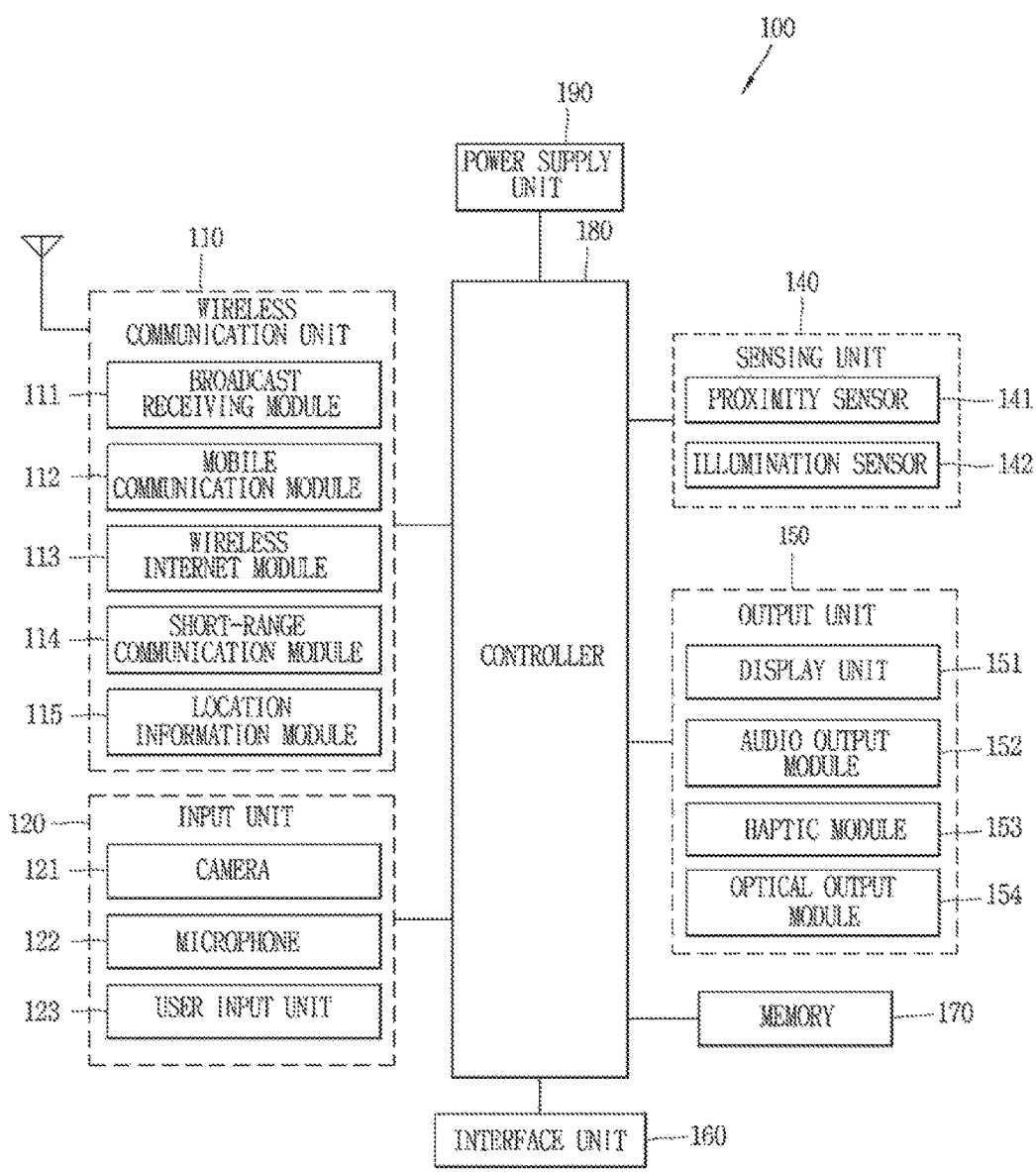
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
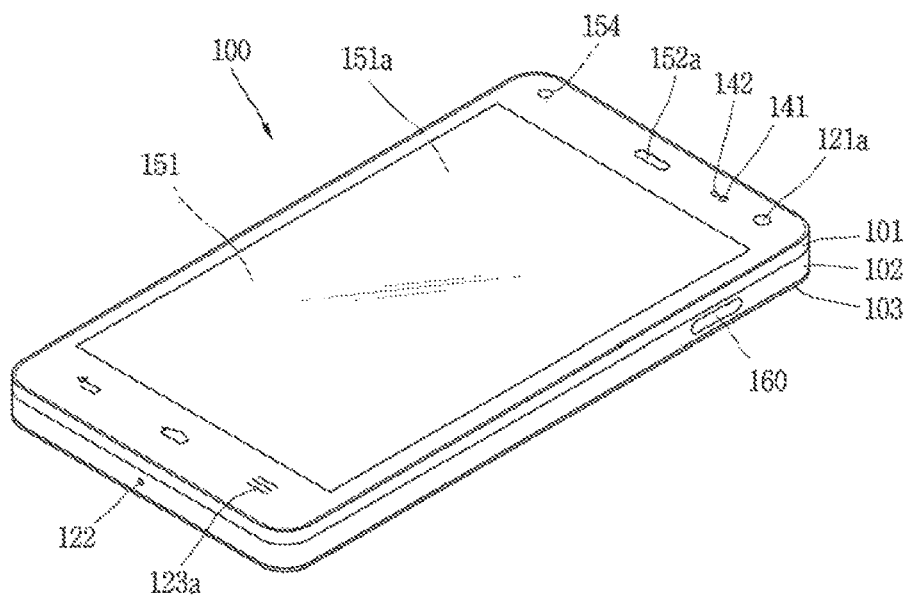
FIGS. 1B and 1C are conceptual views illustrating one example of a mobile terminal according to the present invention, viewed from different directions.
Figure 1C:
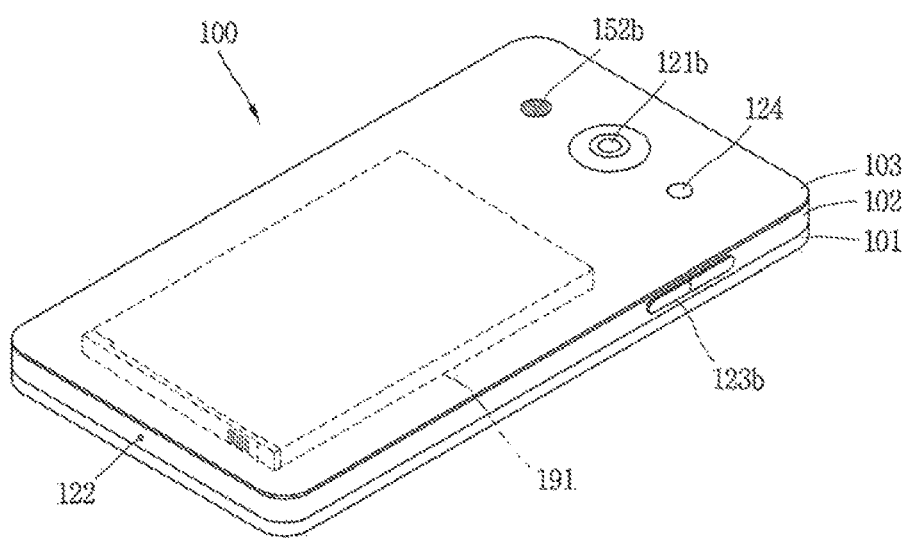

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof.

For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151*a* and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The window 151*a* of the display unit 151 may include a sound hole for emitting sounds generated from the first audio output module 152*a*. However, the present invention is not limited thereto, and the sounds may be released along an assembly gap between the structural bodies (for example, a gap between the window 151*a* and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121*a* may process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like The first and second manipulation units 123*a* and 123*b* may also be manipulated through a proximity touch, a hovering touch, and the like, without a user's tactile feeling.

The drawings are illustrated on the basis that the first manipulation unit 123*a* is a touch key, but the present disclosure may not be necessarily limited to this. For example, the first manipulation unit 123*a* may be configured with a mechanical key, or a combination of a touch key and a push key.

The content received by the first and second manipulation units 123*a* and 123*b* may be set in various ways. For example, the first manipulation unit 123*a* may be used by the user to input a command such as menu, home key, cancel, search, or the like, and the second manipulation unit 123*b* may be used by the user to input a command, such as controlling a volume level being output from the first or second audio output module 152*a* or 152*b*, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152*a* or 152*b*, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123*a* located on the front surface of the terminal body. Accordingly, when the first manipulation unit 123*a* is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

Hereinafter, when explaining the accompanying drawings, when at least two images are illustrated in the form of 2 by 2 in one drawing (FIG. N), an image shown at an upper left is referred to as a "first drawing", an image shown at an upper right is referred to as "second drawing", an image shown at a lower right is referred to as "third drawing", and an image shown at a lower left is referred to as "fourth drawing".

In addition, when at least two images are illustrated in a line from top to bottom in one drawing (FIG. N), those images are referred to as "first drawing, second drawing, . . . ," sequentially from a top image.

Also, when at least two images are illustrated in a line from left to the right in one drawing (FIG. N), the images are referred to as "first drawing, second drawing, . . . ," sequentially from the leftmost image.

The mobile terminal 100 (see FIG. 1A) according to an embodiment of the present invention, which may include at least one of the aforementioned components, may perform an image capturing function. The image capturing function may refer to a function of storing an image received through the camera 121 (see FIG. 1A) in the memory 170 (see FIG. 1A). Here, the operation of the mobile terminal storing the image received through the camera 121 in the memory 170 may be expressed by 'capturing an image', 'acquiring an image', 'photographing an image', ' performing an image capturing operation', and the like. In addition, with no limit to the aforementioned terms, various terms having the meaning of storing the image received through the camera 121 in the memory 170 may be freely used.

An execution of the image capturing function may refer to executing an application activated for image capturing. When the image capturing function is executed, the controller (or a control unit) 180 may activate the camera 121 to be ready for capturing an image.

The image capturing function may be executed, in response to an icon linked to the image capturing function (or an icon of the application) being selected (or touched). When the image capturing function is executed in response to the selection of the icon, the display unit 151 may be turned on. Meanwhile, the image capturing function may be executed when at least one of keys (e.g., at least one of a hardware key and a software key) provided on the mobile terminal, in addition to the selection of the icon linked with the image capturing function. In this case, even if the display unit 151 is off, the controller 180 may execute the image capturing function in response to the selection of the key provided on the mobile terminal.

The mobile terminal according to the present invention may perform the image capturing operation based on a user selection, and the user selection may be expressed by 'user control command' or 'control command'. The user selection may be realized in various manners. For example, the image capturing function may be executed when the user presses a hardware key provided on the mobile terminal or touches a software key or a visual key output on the display unit 151 (see FIG. 1A). That is, the controller 180 (see FIG. 1A) of the mobile terminal 100 may determine that a user control command for executing the image capturing operation has been received when a hardware key linked with the image capturing function is touched or pressed or a software key or a visual key output on the display unit 151 is touched.

Further, the present invention is not limited to this, and the mobile terminal 100 according to the present invention may also capture images based on a reception of various types of user control commands. For example, in a state that an image received (or input) through the camera 121 is output on the display unit 151, the controller 180 may capture the image in response to a preset type of touch being applied to the image or the display unit 151.

The preset type of touch is a touch associated with the image capturing operation, and may include various types of touches. Examples of the preset type of touch may include a short (or tap) touch, a continuous touch that at least two short touches are applied within a reference time, a long touch, a multi-touch, a drag touch, a flick touch, a pinch-in touch, a pinch-out touch, a swipe touch, a hovering touch and the like.

In addition, the mobile terminal 100 according to the present invention may capture the image (or a graphic object included in the image) when the graphic object included in the image (or an image corresponding to a subject to be captured) satisfies a preset condition. For example, when it is determined that the graphic object included in the image is similar to a prestored graphic object by a threshold value or more, the controller 180 may capture the image (or the graphic object).

The image received through the camera 121 may be referred to as a preview image and refers to an image received through the camera 121 in real time. That is, the image (or screen information included in the image) received through the camera 121 may change based on a movement of the mobile terminal 100 by an external force, a movement of subjects existing within an angle of view (a field of view or a viewing angle) of the camera 121, and the like.

The image (or the preview image) may be stored in the memory 170 in a form of one of a still image and a moving image (or a video).

Meanwhile, the mobile terminal 100 according to the present invention may perform an iris recognition function.

An iris recognition (iris scan) refers to a technique or an authentication system for recognizing a person using iris information related to his or her eye having a unique characteristic for each person. That is, the iris recognition function may refer to a function of recognizing or authenticating a user using the iris information related to the eye. In this specification, terms such as iris scanning (or iris recognition), an iris scanning function (or iris recognition function), iris authentication, an iris authentication function, and the like are used interchangeably, and may be understood as having the same/like meaning.

The human iris has characteristics that do not change forever after it is completely formed about 18 months after birth. In other words, a circular iris pattern which rises near an inner surface of the iris (a pupillary margin) hardly changes once it is made, and a shape thereof is different from person to person.

The iris recognition function refers to a function of informatizing a characteristic of iris, which is different for each person, and applying the informatized iris characteristic as an authentication technology for security. For example, the iris recognition function may be a function of performing user authentication by encoding an iris pattern into an iris code using an iris image, and comparing the iris pattern with an iris code prestored in a memory or an external server (since an iris recognition algorithm of encoding an iris pattern into an iris code using an iris image and a method of performing user authentication by comparing iris codes are typical technologies, so detailed description thereof will be omitted).

Various types of cameras may be used to perform the iris recognition function. For example, a camera using infrared rays (or an infrared camera) may be used. Hereinafter, description will be given of an example in which the camera 121 is the infrared camera.

The iris recognition function may use the image capturing function. More specifically, the iris recognition function may include an iris registration step and an iris recognition (or iris scanning) step. The image capturing function using the camera 121 may be used for each of the iris registration step and the iris recognition step.

The iris registration step refers to previously storing (registering) information related to a user's iris (e.g., an iris-related image, an image corresponding to the iris (an iris image), an iris code, etc.) in the memory 170, an external terminal (or an external server), and the like. The iris-related information stored in the iris registration step serves as an object to be compared when the iris recognition step is performed later.

In detail, the controller may execute the iris registration step based on a user request. The user request may include an execution of an application associated with the iris recognition function, an input of a user control command for entering the iris registration step in the application (e.g., a selection of an icon for entering the iris registration step, an input of a preset type of touch associated with a function of entering the iris registration step, and the like), and the like.

Upon entering the iris registration step, the controller 180 may activate the camera (for example, the infrared camera) 121. In addition, the controller 180 may capture an image received through the camera (or an image corresponding to a user's eye) when the image corresponding to the user's eye is identified in the image received through the camera. The captured image may be stored in the memory 170, an external terminal (or an external server), and the like.

The controller 180 may identify the image corresponding to the user's eye included in the captured image and extract an image related to the iris (an iris image or iris-related image) from the image corresponding to the eye.

Thereafter, the controller 180 may encode an iris pattern of the user into an iris code using the iris-related image (the iris image), and store at least one of the iris-related image and the iris code in the memory 170, the external terminal (or the external server), and the like.

Afterwards, the controller may execute the iris recognition function based on a user request. The user request may include an execution of an application associated with the iris recognition function, an input of a user control command for entering the iris recognition step in the application (e.g., a selection of an icon for entering the iris recognition step, an input of a preset type of touch associated with a function of entering the iris recognition step, and the like), and the like.

Upon entering the iris recognition step, the controller 180 may activate the camera (e.g., the infrared camera) 121. In addition, when the image corresponding to the user's eye (eyeball) is identified in the image received through the camera 121, the controller 180 may extract the iris-related image from the image corresponding to the eye. Thereafter, the controller 180 may generate an iris code using the iris-related image, and determine whether the generated iris code matches an iris code prestored in the memory, thereby executing user authentication.

In this case, the extraction of the iris-related image, the generation of the iris code, and the like may be performed after the image received in the iris recognition step is captured, or may be performed in a state where an image is received through the camera without separate image capturing (e.g., in a state where a preview image is output on the display unit 151).

Meanwhile, the mobile terminal 100 according to the present invention may provide various UIs/UXs that can increase a user authentication rate (or an iris recognition rate) through the iris recognition as described above. Hereinafter, description will be given in more detail of a method of increasing a user authentication rate through iris recognition according to the present invention, with reference to the accompanying drawings. Hereinafter, the iris registration step of the iris recognition function described above will be mainly described.

FIG. 2 is a representative flowchart illustrating a control method according to one embodiment of the present invention, and FIG. 3 is a conceptual view illustrating the control method illustrated in FIG. 2.

The present invention can improve an authentication rate by storing a plurality of different iris-related information (e.g., iris-related images, iris codes, etc.) which are objects to be compared when performing the iris recognition, and executing the iris recognition (or the user authentication) using the iris-related image received in the iris recognition step and the prestored plurality of different iris-related information.

Referring to FIG. 2, in order to acquire the plurality of different iris-related information (or the plurality of different iris-related images), in the present invention, an image received through the camera is displayed in a part of a display area (or an output area) of the display unit (S210). Specifically, when an image is received through the camera 121 (for example, a camera using infrared rays (i.e., an infrared camera)), the controller 180 may output at least part of the image in a part of the display area of the display unit 151.

Referring to a first drawing of FIG. 3, the display area A of the display unit 151 may have a size corresponding to a size of the display unit 151. Here, every screen information that can be output in the mobile terminal disclosed herein may be output in the display area A of the display unit 151.

Upon an execution of the iris recognition function (or upon entering the iris registration step), the controller 180 may activate the camera 121 and output an image 300 received through the camera 121 on a partial area R1 of the display area A of the display unit 151. The camera 121, as illustrated in the first drawing of FIG. 3, may be disposed, together with the display unit 151, on the front surface of the main body of the mobile terminal.

The partial area R1 may be at least part of the display area A of the display unit 151, and various types of screen information may be output in the remaining area, except for the partial area R1, of the display area A of the display unit 151. For example, no screen information may be output in the remaining area, or guide information for guiding the iris registration, icons associated with various functions related to the iris recognition function, indicators, graphic objects, buttons, and the like may be output in the remaining area.

The size of the partial area R1 in which the image 300 received through the camera 121 is output may also be determined according to a user setting or a size of the image 300. In addition, the size of the image 300 (or the size of the partial area R1) may be changed by a user control command. For example, when a drag input started at an edge of the image 300 (or the partial area R1) is applied, the controller 180 may change the size of the image 300 based on the drag touch. As another example, the controller 180 may reduce the size of the image 300 in response to a pinch-in touch being applied to the image 300 (or the partial area R1), or increase the size of the image 300 in response to a pinch-out touch being applied to the image 300.

The present invention can output the image 300 received through the camera 121 only on the partial area R1 of the display area A of the display unit 151, so that the user's eye (eyeball) can be induced to be included in the image 300, which may result in more accurately capturing an iris-related image required for the iris registration.

Also, although not illustrated, the controller 180 may display (or overlap) a graphic object (e.g., an eye-like image) on (with) the image 300 that guides a position with which the user's eye is aligned.

Referring back to FIG. 2, in order to capture different images related to an iris (i.e., different iris-related images), when the image is captured, the captured image is output in an area different from an area where the image has been located upon the capturing (S220).

Specifically, in order to capture a plurality of iris-related images, when the image output in the partial area of the display unit 151 is captured, the controller 180 may output the captured image in an area different from the partial area where the image has been located upon the capturing.

For example, as illustrated in first and second drawings of FIG. 3, in a state where the image 300 received through the camera 121 is output in the partial area R1 of the display area A of the display unit 151, when capturing of the image 300 is executed, the controller 180 may output the captured image 300 on another area R2 different from the partial area R1. The another area R2 may overlap at least part of the output area R1 of the image 300 (or the partial area R1) upon the capturing or may not overlap the partial area R1 upon capturing the image 300.

Specifically, when the image 300 is captured while the image 300 is output in a first area (or partial area) R1, the controller 180 may output the image 300 in a second area R2 different from the first area R1. Here, outputting the image on the second area different from the first area may include the meaning of 'moving the image' or 'changing an output position of the image'.

At this time, an output size of the image 300 may be maintained constant even if the output area (or the output position) of the image 300 is changed. More specifically, when the image 300 output in the partial area R1 of the display area A of the display unit 151 is captured, the controller 180 may output the image 300 on the another area R2 different from the partial area R1 while maintaining the size of the image 300.

Accordingly, a first iris-related image 310*a* may be captured while the image 300 is output in the first area R1, and a second iris-related image 310*b*, different from the first iris-related image 310*a*, may be captured due to a change of the user's gaze while the image 300 is output in the second area R2 different from the first area R1.

Here, the iris-related image may include an image corresponding to the user's eye, an image corresponding to the iris included in the user's eye (or an iris image), and the like.

Also, capturing the iris-related image may include capturing an iris-related image and thereafter generating/storing iris-related information (e.g., an iris code) through an iris recognition algorithm using the captured iris-related image.

The capturing of the image may be performed a preset number of times. At this time, the controller 180 may change the output position of the image every time when the image is captured. The preset number of times may be determined by the control of the user or the controller.

With this configuration of the present invention, an output position of an image received through a camera can change when capturing an iris-related image, so as to induce a change of the user's gaze and accordingly allow a plurality of different iris-related images to be captured. In addition, according to the present invention, different iris-related images may be captured and prestored. Accordingly, even if states of iris-related images included in images received through the camera are changed due to a surrounding environment or a user's posture upon scanning the iris, iris recognition (or user authentication) can be performed by using the different iris-related images, thereby remarkably improving an iris recognition rate (or a user authentication rate).

Hereinafter, description will be given in more detail of a method of displaying an image received through a camera on a partial area of a display area of a display unit, with reference to the accompanying drawings.

Figure 4A:
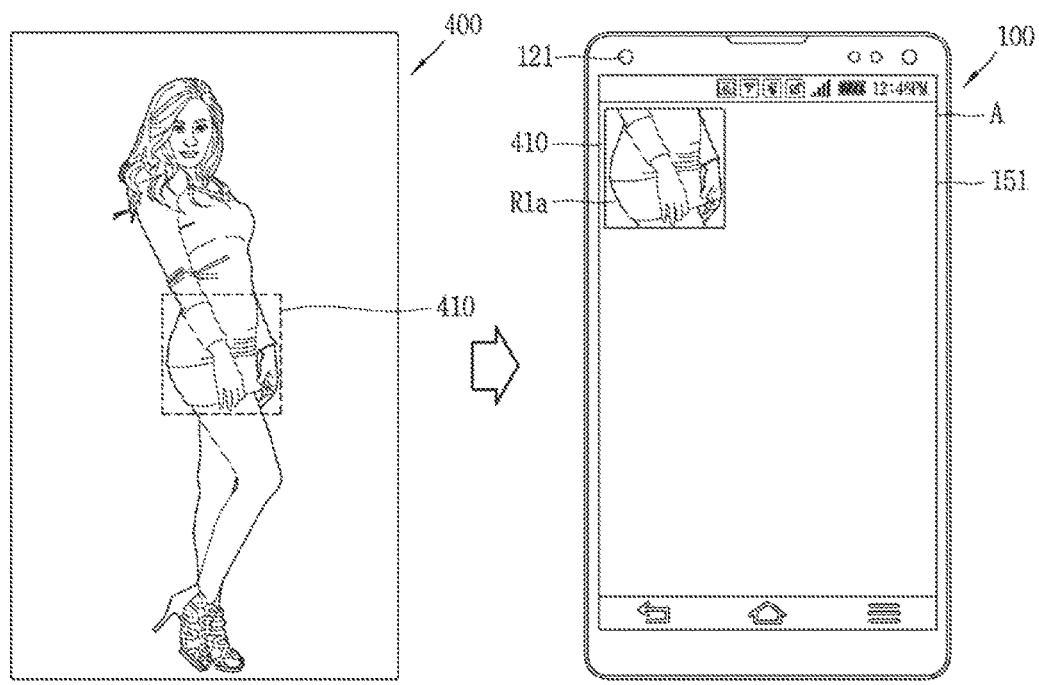
FIGS. 4A, 4B, and 4C are conceptual views illustrating images output in a part of an output area of a display unit.
Figure 4B:
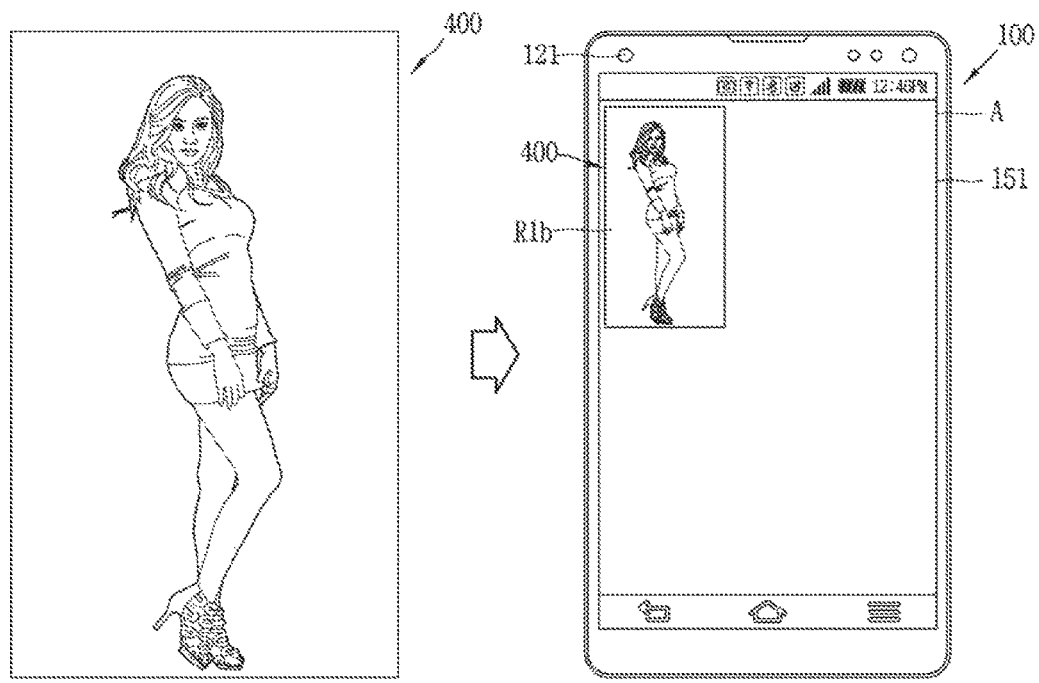
Figure 4C:
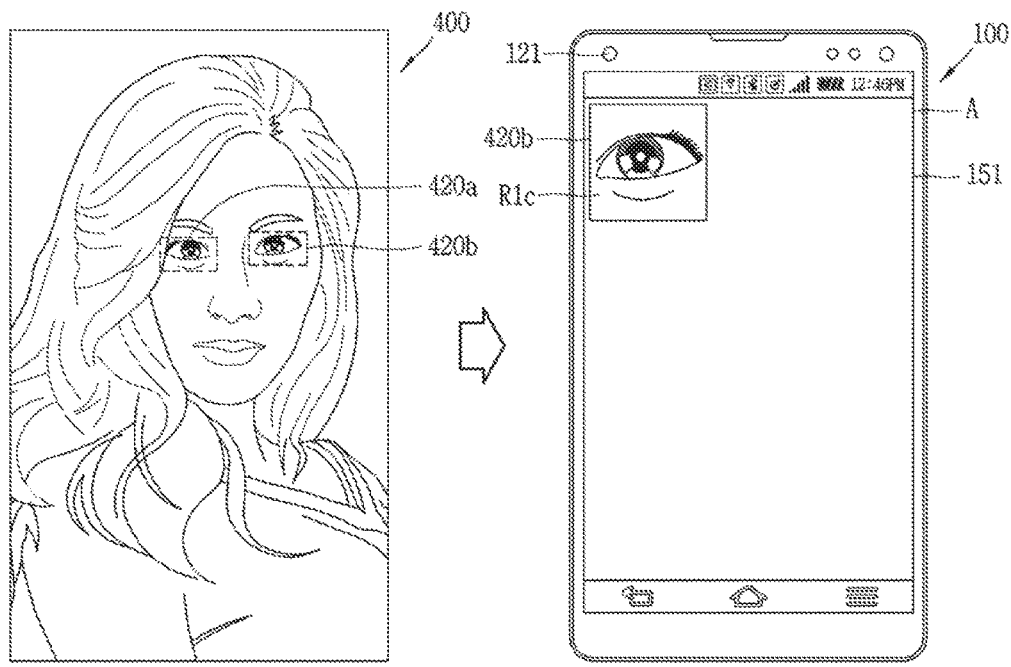

FIGS. 4A, 4B, and 4C are conceptual views each illustrating an image output in a partial area of a display area of a display unit.

In the mobile terminal according to the present invention, an image received through a camera may be output in a part of a display area of the display unit 151 in various ways.

Here, the image, which is received through the camera and then displayed on the partial area, may be the entire image received through the camera 121 or may be at least a part of the image.

For example, as illustrated in FIG. 4A, the controller 180 may display an image 410 corresponding to a part of an entire image 400 received through the camera on a partial area R1a of the display area of the display unit 151. The part of the entire image 400 may be previously designated by a user setting. For example, as illustrated in a first drawing of FIG. 4A, the part of the entire image 400 may be a center portion 400, which has a predetermined size, of the entire image 400.

As another example, as illustrated in FIG. 4B, the controller 180 may also display the entire image 400 received through the camera on a partial area R1b of the display area of the display unit 151.

As another example, as illustrated in FIG. 4C, the controller 180 may extract at least one area, which includes an image corresponding to the user's eye, of the entire image 400 received through the camera. The controller 180 may track the at least one area including the image corresponding to the user's eye even if the terminal is moved by an external force or screen information included in the image is changed in response to the user's movement.

Images 420a and 420b corresponding to the at least one area may include the image corresponding to the user's eye (or an iris-related image).

Then, the controller 180 may extract one (e.g., 420b) of the images 420a and 420b corresponding to the at least one area including the image corresponding to the user's eye and output the extracted image 420b on a partial area R1c of the display area of the display unit 151.

In the state where the at least part of the image received through the camera is output in the partial area of the display area of the display unit 151, although not illustrated, guide information for inducing an output of the image corresponding to the eye (or the iris-related image) may be output in the image. The guide information may be displayed on various positions, for example, on the remaining area of the display area of the display unit 151, other than the partial area where the image is displayed.

In addition, the mobile terminal according to the present invention may output at least part of an image received through the camera on a partial area of the display area of the display unit 151 in various ways.

With this configuration, the present invention can provide a user interface capable of displaying an image received through a camera on a part of a display area of the display unit 151 in various ways.

Figure 5:
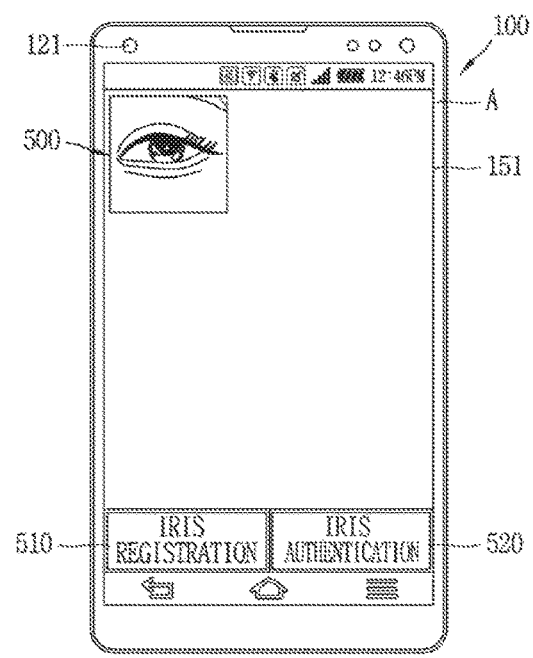
FIG. 5 is a conceptual view illustrating an interface related to an iris recognition function in accordance with the present invention.

Referring to FIG. 5, FIG. 5 is a conceptual view illustrating an interface associated with an iris recognition function according to the present invention.

As illustrated in FIG. 5, the mobile terminal according to the present invention may display screen information related to an iris recognition function on the display unit 151 when the iris recognition function is executed. As described above, at least part of an image received through the camera may be displayed on a partial area of the display area of the display unit 151. In addition, the controller 180 may further output icons associated with various functions related to the iris recognition function, for example, an icon 510 associated with a function of entering an iris registration step, an icon 520 associated with a function of entering an iris recognition step, and the like.

When the icon 510 associated with the function of entering the iris registration step is selected, a function of capturing different images related to the iris may be performed. When the icon 520 associated with the function of entering the iris recognition step is selected, a new iris-related image is received using the image received through the camera, and the iris recognition may be performed using the new iris-related image and the different iris-related images prestored in the iris registration step (the method of performing the iris recognition in the iris recognition step is a general technique, so detailed description thereof will be omitted).

Hereinafter, description will be given in more detail of a method of capturing different images related to an iris (or different iris-related images) to be compared during iris recognition according to the present invention, with reference to the accompanying drawings.

Figure 6A:
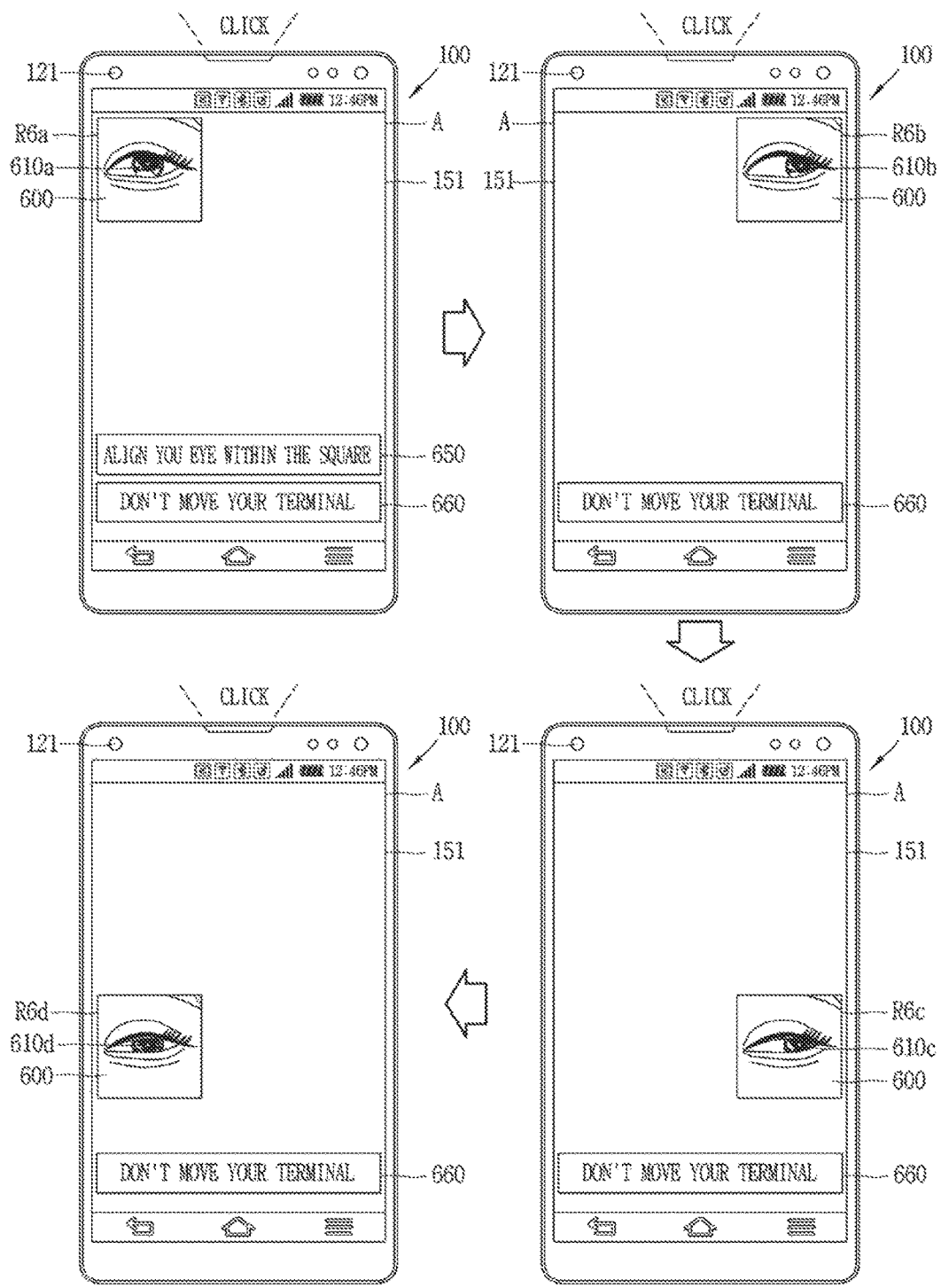
Figure 6B:
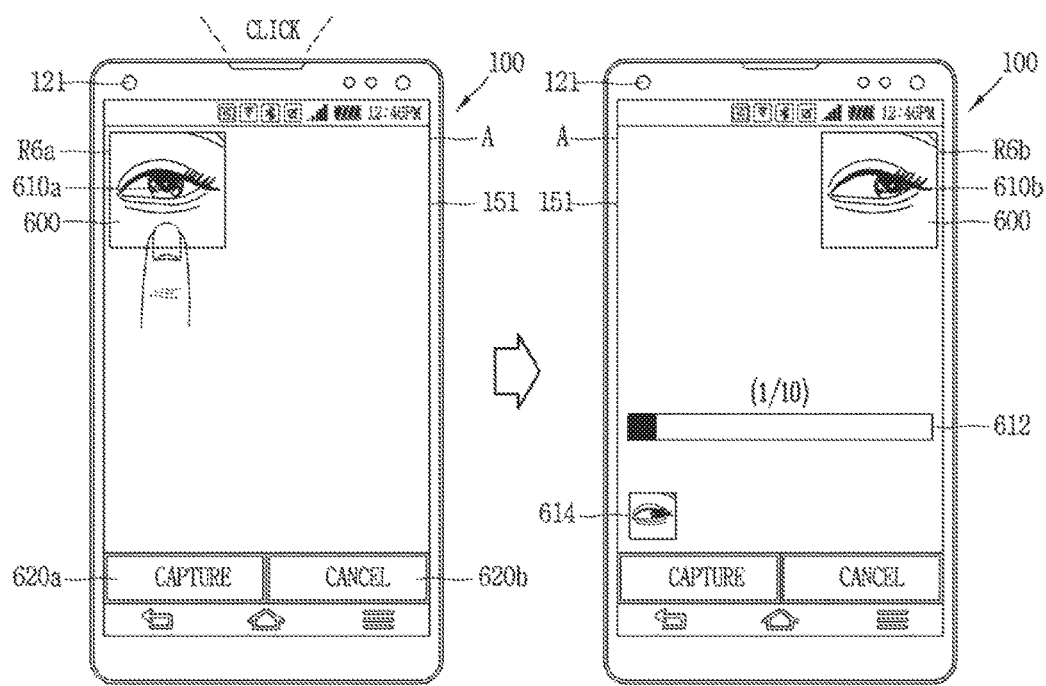

FIGS. 6A, 6B and 7 are conceptual views illustrating a method of acquiring different iris-related images.

First, referring to FIG. 6A, as illustrated in a first drawing of FIG. 6A, the controller 180 may enter an iris registration step to capture and register different images related to an iris (or different iris-related images). Upon entering the iris registration step, the controller 180 may output an image 300 received through the camera 121 in a partial area R6a of the display area of the display unit 151. Here, the image output in the partial area R6a may be an image according to one of the methods illustrated in FIGS. 4A to 4C.

Thereafter, the controller 180 may capture an image 600 output in the partial area R6a in various ways in order to capture (or store, acquire, etc.) an iris-related image. For example, the controller 180 may capture the image 600, in response to the iris-related image being recognized in the image 600. Capturing of the image 600 may refer to capturing the image 600 output on the display unit 151, capturing at least part of the image 600 (e.g., the iris-related image), and the like.

As described above, the iris-related image may include an image corresponding to the user's eye, an image corresponding to the iris included in the user's eye (or an iris image), and the like.

In detail, when an image related to the user's iris (or an image corresponding to the eye) is output on (included in) the image 600 received through the camera, the controller 180 may recognize the image. The controller 180 may recognize the iris-related image in various manners. For example, the controller 180 may recognize the iris-related image using an image analysis function for the image.

For example, the memory 170 may prestore therein a template corresponding to an eye (or a template corresponding to an iris). When the prestored template corresponding to the eye and a shape of the iris-related image included in the image received through the camera match each other by a preset threshold value or more, the controller 180 may recognize the iris-related image.

The controller 180 may capture the image 600, in response to the iris-related image being recognized in the image 600. After capturing the image 600, the controller 180 may extract a portion corresponding to the iris from the image 600 using the iris-related image included in the image 600, and generate and store iris-related information (e.g., an iris code) using the extracted portion.

Meanwhile, in the state that the iris-related image is included in the image, the controller 180 may capture the image when the output of the iris-related image is maintained for a preset time. In detail, in the state that an iris-related image 610a is output in the image, the controller 180 may capture the image 600 when a movement (or change) of the iris-related image 610a is not detected for a preset time.

Also, as illustrated in a first drawing of FIG. 6A, the display unit 151 may further display thereon guide information 650 for guiding the iris-related image to be output in (included in) the image, guide information 660 for inducing the iris-related image to be continuously output for a preset time, and the like.

Upon capturing the image 600 received through the camera, which is output in the first area R6a corresponding to the partial area of the display area of the display unit 151, the controller 180, as illustrated in a second drawing of FIG. 6A, may output the image 600 in a second area R6b different from the first area R6a. As the image 600 is displayed in the second area R6b different from the first area R6a, the user's gaze may change, and accordingly an iris-related image 610b included in the image 600 output in the second area R6b may be different from the iris-related image 610a included in the image output in the first area R6a.

In the state that the image 600 is output in the second area R6b, as illustrated in a second drawing of FIG. 6A, the controller 180 may capture the image 600 when the iris-related image 610b is recognized in the image 600 and the output of the iris-related image 610b is maintained for a preset time.

FIG. 6A exemplarily illustrates capturing is performed four times. At this time, as illustrated in FIG. 6A, each capturing may be performed when the image 600 is output in different areas R6a, R6b, R6c, and R6d. Further, each capturing may be performed on the basis of satisfaction of the aforementioned conditions.

Accordingly, the controller 180 may capture (store or acquire) different iris-related images 610a, 610b, 610c, and 610d. In addition, the controller 180 may generate iris-related information (e.g., an iris code) for each of the different iris-related images 610a, 610b, 610c, and 610d, and use the iris-related information upon scanning the iris later.

On the other hand, the controller 180 may capture an image received through the camera based on a user control command.

For example, as illustrated in a first drawing of FIG. 6B, in a state where an image 600 received through the camera is output in a partial area R6a of the display area of the display unit 151, the controller 180 may capture the image 600 in response to a preset touch being applied to the image 600 (or the display unit 151).

Here, the preset touch is a touch associated with an image capturing operation for the image 600, and may include various types of touches. Examples of the preset type of touch may include a short (or tap) touch, a continuous touch that at least two short touches are applied within a reference time, a long touch, a multi-touch, a drag touch, a flick touch, a pinch-in touch, a pinch-out touch, a swipe touch, a hovering touch and the like.

As another example, the display unit 151 may output thereon an icon 620a (or a button, a key, a graphic object, and the like) associated with an image capturing operation for the image. In this case, the controller 180 may capture the image 600 in response to a touch being applied to the icon 620a.

At this time, the controller 180 may perform the capturing of the image 600 on the assumption that the iris-related image 610a is recognized in the image 600. In detail, in the state that the iris-related image 610a is recognized in the image 600, the controller 180 may capture the image 600 in response to a preset touch being applied to the image 600 or the icon 620a.

That is, the controller 180 may not perform the capturing when the iris-related image 610a is not recognized in the image 600 even though a preset touch is applied to the image 600 or the icon 620a.

In this case, the controller 180 may output notification information for guiding the recognition when the iris-related image 610a is recognized in the image 600. The notification information may be in the form of sound, vibration, text, graphic object, icon, and the like. When the icon 620a is output on the display unit 151, the controller 180 may output the icon 620a in an inactive state of restricting a response to a touch input before the recognition, and then change the icon 620a into an active state of allowing the response to the touch input based on the recognition.

When the capturing for the image 600 is performed, as illustrated in a second drawing of FIG. 6B, the controller 180 may output the image 600 in an area R6b different from the area R6a, in which the image 600 has been output upon captured. In the state where the image 600 is output in the different area R6b, the controller 180 may capture the image 600 based on a reception of a user control command as described above.

Meanwhile, as illustrated in the second drawing of FIG. 6B, the controller 180 may output an indicator 612 (or a progress bar) for guiding the number of times of capturing the image 600, and a thumbnail of the captured image (or the captured image) 614, and the like on the display unit 151. The indicator 612 and the thumbnail 614 may be output in at least part of the display area of the display unit 151, for example, in the remaining area, except for the partial area where the image 600 is output, of the display area of the display unit 151.

The contents illustrated in FIGS. 6A and 6B are not limited to each embodiment, but may be implemented by combination of at least two embodiments.

On the other hand, when an image output in a partial area of the display area of the display unit 151 is captured, the controller 180 may change a method of outputting the image in various ways.

For example, as illustrated in a first drawing of FIG. 7, in a state where an image 700 received through the camera 121 is output in a first output size S1 within a partial area of the display area of the display unit 151, when the image 700 is captured, the controller 180, as illustrated in a second drawing of FIG. 7, may output the image 700 in a second output size S2 different from the first output size S1.

Likewise, when the image 700 having the second output size S2 is then captured, the controller 180, as illustrated in a third drawing of FIG. 7, may output the image 700 in a third output size S3 different from the second output size S2.

For example, the first to third output sizes S1 to S3 may gradually become larger as illustrated in FIG. 7.

When the output size of the image 700 is changed, at least one of an amount of light projected to the user's eye and a focal length is changed, and thus a shape of the user's eye (or an iris shape, a pupil shape, etc.) is changed.

Accordingly, the controller 180 may change the output size of the image 700, so as to acquire different iris-related images 710*a*, 710*b*, and 710*c*. For example, as illustrated in FIG. 7, since the amount of light projected to the user's eye increases as the size of the image 700 displayed on the display unit 151 increases, the pupil of the eye may gradually be reduced in size. Accordingly, since the iris shape is also changed, the iris-related image included in the image 700 may be changed.

With this configuration of the present invention, different iris-related images can be obtained by changing the size of the image displayed in the partial area of the display area of the display unit.

Meanwhile, in the present invention, various user interfaces that can induce successful capturing when capturing of an image fails may be provided.

Hereinafter, description will be given in more detail of various embodiments of a case where capturing of an image fails and a control method in the case, with reference to the accompanying drawings.

Figure 8A:
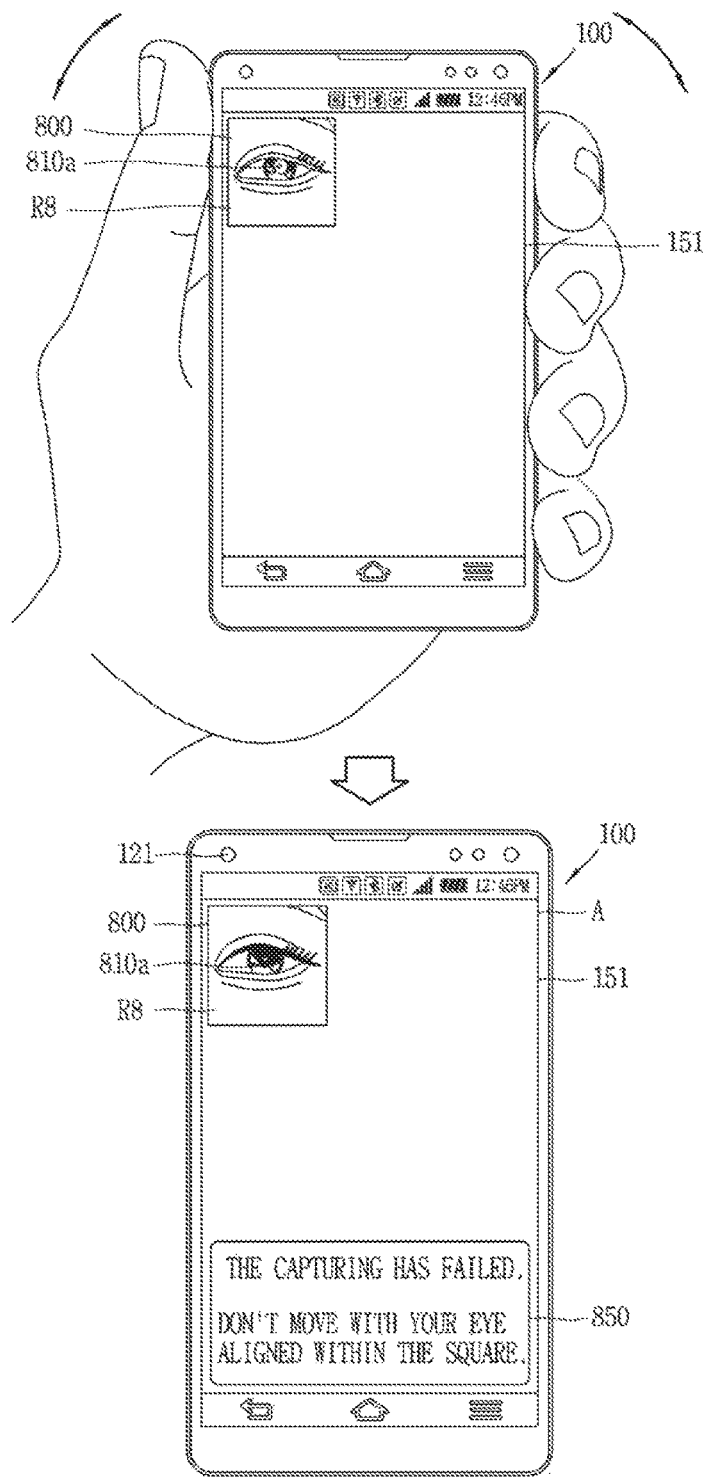
FIGS. 8A and 8B are conceptual views illustrating a method of inducing capturing of an iris-related image when a condition that the iris-related image is not captured is satisfied.
Figure 8B:
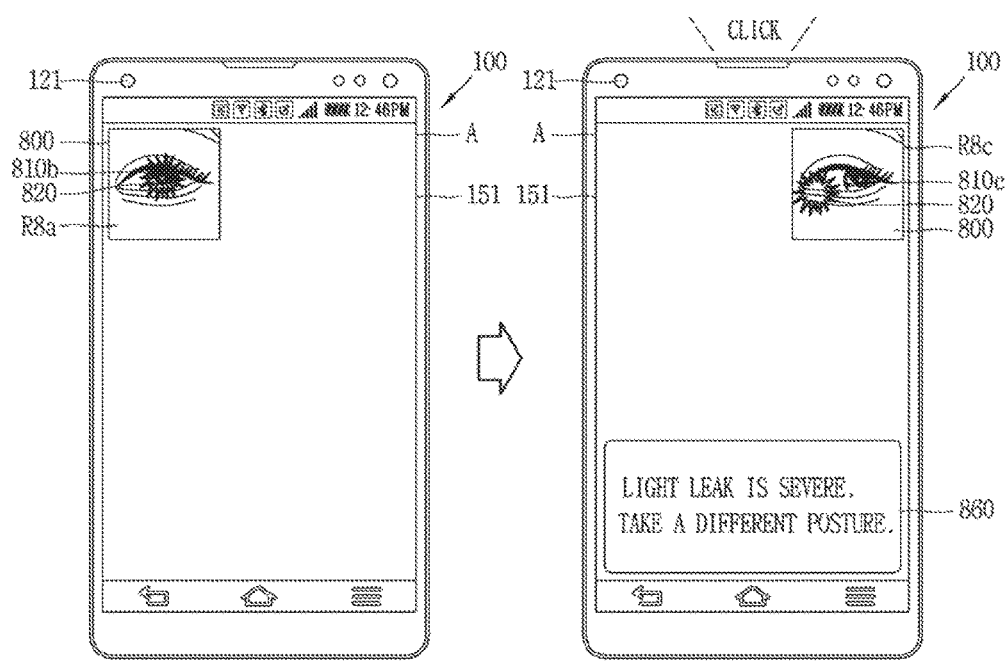

FIGS. 8A and 8B are conceptual views illustrating a method of inducing capturing of an iris-related image when a condition that the iris-related image is not captured is satisfied.

As described above, the mobile terminal according to the present invention can capture an image including an iris-related image, based on at least one of a case where an iris-related image is recognized in an image received through a camera, a case where an output of the iris-related image is maintained for a preset time, a case where a preset touch is applied to the received image, and a case where an icon associated with an image capturing operation for the received image is touched.

In the meantime, the controller 180 may not perform capturing of an image 800, which is received through the camera 121, when a preset condition is satisfied even though the image 800 is output in a partial area R8 of the display area of the display unit 151 and an iris-related image 810*a* is recognized in the image 800.

The preset condition may refer to a condition that the capturing is not performed. For example, the preset condition may include a case where the mobile terminal moves, a case where the iris-related image included in the image moves (or changes), a case where a color included in the image corresponds to a preset color, and the like.

For example, as illustrated in a first drawing of FIG. 8A, the controller 180 may not perform capturing when a movement of a main body of the mobile terminal is detected even though the iris-related image 810*a* is recognized in the image 800 output in the partial area R8 of the display area of the display unit 151. In this case, in a state where the output position of the image 800 is maintained, as illustrated in a second drawing of FIG. 8A, the controller 180 may output on the display unit 151 notification information 850 including at least one of information of informing a failure of the capturing, and information for guiding a restriction of a movement of the terminal/user.

As another example, as illustrated in FIG. 8B, when an iris-related image 810*b* recognized in the image 800 corresponds to a preset condition, the controller 180 may output the image 800 in a different area, other than capturing the image 800.

For example, as illustrated in a first drawing of FIG. 8B, the preset condition may be a case where brightness of at least part 820 of the iris-related image 810*b* included in the image 800 is higher than reference brightness. Specifically, when a user wears glasses or the like, light leak or glare (or light reflection) occurs due to the glass provided in the glasses, which may causes a case where brightness of at least part of the iris-related image 810*b* included in the image 800 is higher than the reference brightness.

Here, the at least part of the iris-related image 810*b* may refer to an image portion corresponding to a pupil or iris. That is, when the at least part of the iris-related image 810*b* corresponds to a light leakage portion 820, the brightness of the at least part may be higher than the reference brightness.

In this case, the controller 180 may output the image 800 in an area R8*b* different from an area R8*a*, instead of capturing the image 800. In this case, as the output position of the image 800 changes, the user moves the terminal or performs an operation of changing a posture. Thus, as illustrated in a second drawing of FIG. 8B, the at least part of the iris-related image 810*b* (e.g., an image portion corresponding to the pupil or iris) and the light leakage portion 820 do not correspond to each other, and accordingly the brightness of the at least part of the iris-related image 810*b* is lower than the reference brightness (i.e., a portion where the light leakage (or light reflection) occurs is out of the image portion corresponding to the pupil or iris).

When the brightness of the at least part 820 of the iris-related image 810*b* is higher than the reference brightness, the controller 180 may change the output position of the image 800 and simultaneously output notification information 860 on the display unit 151 to guide the user to take another posture.

As illustrated in the second drawing of FIG. 8B, when the brightness of the at least part of the iris-related image 810*b* is lower than the reference brightness (i.e., when the at least part and the light leakage portion 820 do not match each other), the controller 180 may capture the image and acquire the iris-related image.

With this configuration, the present invention can provide a user interface capable of capturing or acquiring an iris-related image in an optimized state even when a surrounding environment changes. The contents illustrated in FIGS. 8A and 8B may be applied not only to the iris registration step but also to the iris recognition step for scanning the iris.

Meanwhile, the mobile terminal 100 according to the present invention may provide various UIs/UXs that can increase a user authentication rate (or an iris scan rate) through the iris recognition as described above. Hereinafter, description will be given in more detail of a method of increasing a user authentication rate through iris recognition according to the present invention, with reference to the accompanying drawings. Hereinafter, the iris registration step of the iris recognition function described above will be mainly described.

Figure 9:
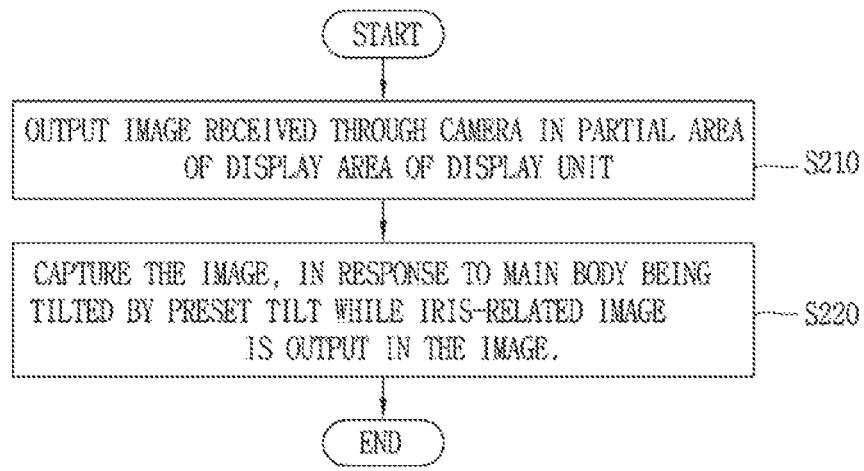
FIG. 9 is a flowchart illustrating a representative control method in accordance with another embodiment of the present invention.
Figure 10:
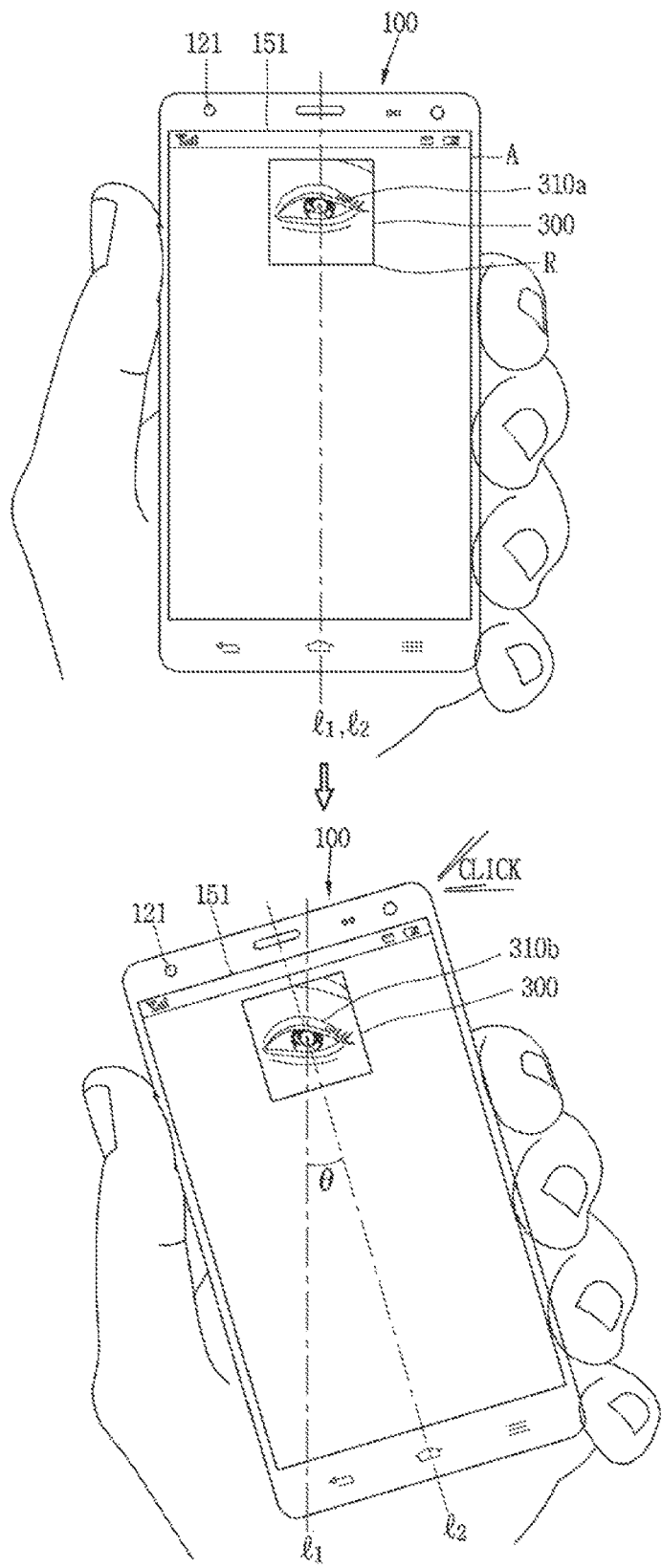
FIG. 10 is a conceptual view illustrating the control method illustrated in FIG. 9.

FIG. 9 is a flowchart typically illustrating a control method according to another embodiment of the present invention, and FIG. 10 is a conceptual view illustrating the control method illustrated in FIG. 9.

The present invention can improve the authentication rate by storing a plurality of different iris-related information (e.g., iris-related images, iris codes, etc.) which are objects to be compared upon performing iris recognition, and executing the iris recognition (or user authentication) using an iris-related image received in an iris recognition step and the prestored plurality of different iris-related information.

Referring to FIG. 9, in order to acquire a plurality of different iris-related information (or a plurality of different iris-related images), an image received through a camera is output on a display unit (S910). Specifically, when an image is received through the camera 121 (e.g., a camera using infrared rays (infrared camera)), the controller 180 may output the image on the display unit 151.

In this instance, as illustrated in FIG. 10, the controller 180 may output an image 300 received through the camera in a partial area R of a display area A of the display unit 151. Here, the display area A of the display unit 151 may have a size corresponding to a size of the display unit 151. Also, every screen information which can be output by the mobile terminal according to the present invention may be output in the display area A of the display unit 151.

When an iris authentication function is executed (i.e., when an iris registration step is executed), the controller 180 may activate the camera 121 and output the image 300 received through the camera in a partial area R of the display area A of the display unit 151. The camera 121, as illustrated in a first drawing of FIG. 10, may be disposed, together with the display unit 151, on the front surface of the main body of the mobile terminal. Hereinafter, for convenience of explanation, the mobile terminal and the main body are denoted by the same reference numeral 100.

The partial area R1 may be at least part of the display area A of the display unit 151, and various types of screen information may be output in the remaining area, except for the partial area R1, of the display area A of the display unit 151. For example, no screen information may be output in the remaining area, or guide information for guiding the iris registration, icons associated with various functions related to the iris recognition function, indicators, graphic objects, buttons, and the like may be output in the remaining area.

The size of the partial area R1 in which the image 300 received through the camera 121 is output may also be determined according to a user setting or a size of the image 300. In addition, the size of the image 300 (or the size of the partial area R1) may be changed by a user control command. For example, when a drag input started at an edge of the image 300 (or the partial area R1) is applied, the controller 180 may change the size of the image 300 based on the drag touch. As another example, the controller 180 may reduce the size of the image 300 in response to a pinch-in touch being applied to the image 300 (or the partial area R1), or increase the size of the image 300 in response to a pinch-out touch being applied to the image 300.

The present invention can output the image 300 received through the camera 121 only in the partial area R of the display area A of the display unit 151, so that the user's eye (eyeball) can be induced to be included in the image 300, which may result in more accurately capturing an iris-related image required for the iris registration.

The controller 180 may also output (or overlap) a guide image for guiding a position where the iris-related image is to be output (or a graphic object for guiding a position where the user's eye is to be aligned) on (or with) the image 300 (see FIGS. 8A and 8B). The guide image may include various types of images such as an eye-like image, a circle image, and the like. The guide image may overlap a part of the image 300.

The controller 180 may capture the image 300 when the guide image corresponds to (matches) the iris-related image 310 included in the image 300 received through the camera 121. The related contents will be described later in detail with reference to FIGS. 8A and 8B.

Referring back to FIG. 9, in the state where the iris-related image is output in the image, the image is captured based on a main body being tilted by a preset tilt (or tilt angle).

Specifically, in order to capture a plurality of iris-related images, the controller 180 may capture the image 300, in response to the main body 100 of the mobile terminal being tilted by a preset tilt, in the state where the iris-related image 310 is output in the image 300.

Here, the iris-related image may include an image corresponding to the user's eye, an image corresponding to the iris included in the user's eye (or an iris image), and the like.

In addition, capturing the image may refer to capturing an iris-related image output in the image. In addition, capturing the image (or capturing the iris-related image) may refer to generating/storing iris-related information (e.g., an iris code) through an iris recognition algorithm using the iris-related image after capturing the iris-related image.

The capturing of the image may be performed a preset number of times. Specifically, the controller 180 may capture an image every time when the main body is tilted so as to correspond to different tilts (preset tilts), and the number of the preset tilts may correspond to the preset number of times. The preset tilts may be set by a user.

The sensing unit 140 (see FIG. 1) may detect a posture of the main body 100. The posture of the main body 100 should be understood as meaning including a placed state of the main body 100 and a movement (rotation, tilt and the like) of the main body 100.

For example, the sensing unit 140 may detect a placed state of the main body 100. The placed state of the main body 100 may refer to a posture taken by the main body in a real space. For example, the controller 180 may determine that the main body 100 is placed in a perpendicular direction when a virtual line corresponding to a lengthwise direction of the main body 100 corresponds to a virtual line corresponding to a gravitational direction through the sensing unit 140.

In addition, the sensing unit 140 may detect a movement of the main body 100 by an external force. In this case, the controller 180 may determine through the sensing unit 140 whether the main body 100 has been moved, rotated, tilted, or the like. In addition, when the main body is tilted by an external force, the controller 180 may determine through the sensing unit 140 how much the main body 100 is tilted.

As illustrated in a first drawing of FIG. 10, an image 300 received through the camera 121 may be output in a partial area R of a display area A of the display unit 151.

Afterwards, as illustrated in a second drawing of FIG. 10, in the state where the iris-related image 310a is output in the image 300, when the main body 100 is tilted to correspond to a preset tilt, the controller 180 may capture the image 300.

For example, the controller 180 may determine a tilted degree (tilt) of the main body based on an angle between a virtual line 11 corresponding to the gravitational direction and a virtual line 12 corresponding to the lengthwise direction of the main body. For example, assuming that the angle between 11 and 12 is θ, the controller 180 may capture the image 300, in response to the main body being tilted to correspond to a preset tilt (i.e., when an angle between 11 and 12 is θ), in a state where the iris-related image 310b is output in the image 300 received through the camera 121.

In this instance, as illustrated in the second drawing of FIG. 10, when the image is captured in response to the main body being tilted to the left by θ, the iris-related image included in the image may be captured in a state of being rotated to the right by θ.

The preset tilt may be set in plurality, which may be different from one another. Accordingly, the controller 180 can capture the image 300 every time when the main body is tilted to corresponding to the plurality of preset tilts in the state where the iris-related image is included in the image 300.

Specifically, the controller 180 may capture the image in response to the main body being tilted by a preset first tilt and thereafter capture the image again in response to the main body being tilted by a preset second tilt different from the first tilt, so as to capture different iris-related images. That is, the capturing may be performed every time when the main body 100 is tilted to correspond to the plurality of preset tilts.

For example, when the plurality of preset tilts are set to 10° to the left, 20° to the left, 0°, 10° to the right, and 20° to the right, the controller 180 may capture the image in response to the main body 100 being tilted by 10° to the left, and capture the image again in response to the main body 100 being tilted by 20° to the left. Further, the controller 180 may capture the image in response to the main body 100 being tilted perpendicularly (by 0°), by 10° to the right and by 20° to the right, respectively.

Meanwhile, when the image is captured in response to the main body 100 being tilted to correspond to any one of the preset tilts, the controller 180 may not capture the image later even though the main body 100 is tilted to correspond to the any one tilt. For example, when it is sensed that the main body 100 is tilted by 10° to the left again after capturing is performed in response to the main body being tilted by 10° to the left, the controller 180 may not perform the capturing. However, the present invention is not limited to this, but may alternatively be implemented to perform capturing every time the main body is tilted by the same tilt or to perform capturing a preset number of times even though the main body is tilted by the same tilt.

In addition, the capturing may be performed on the assumption that the iris-related image is included in the image 300. Specifically, the controller 180 may capture the image 300 when the main body 100 is tilted to correspond to a preset tilt and it is recognized that the iris-related image is included in the image 300. For example, even if the main body 100 is tilted so as to correspond to a preset tilt, the controller 180 may not perform the capturing when the iris-related image is not included (or displayed) in the image 300.

As described above, the iris-related image may include an image corresponding to the user's eye, an image corresponding to the iris included in the user's eye (or an iris image), and the like.

In detail, when an image related to the user's iris (or an image corresponding to the eye) is output in the image 300 received through the camera, the controller 180 may recognize the image. The controller 180 may recognize the iris-related image in various manners. For example, the controller 180 may recognize the iris-related image using an image analysis function for the image.

For example, the memory 170 may prestore therein a template corresponding to an eye (or a template corresponding to an iris). When the prestored template corresponding to the eye and a shape of the iris-related image included in the image received through the camera match each other by a preset threshold value or more, the controller 180 may recognize the iris-related image.

The controller 180 may capture the image 300, in response to the iris-related image being recognized in the image 300. After capturing the image 600, the controller 180 may extract a portion corresponding to the iris from the image 600 using the iris-related image included in the image 600, and generate and store iris-related information (e.g., an iris code) using the extracted portion.

On the other hand, in a state where the iris-related image is output in the image 300, the controller 180 may capture the image 300 in response to the main body 100 being kept tilted to correspond to the preset tilt for a predetermined time. In addition, in a state where the iris-related image is output in the image 300, the controller 180 may capture the image in response to an output of the iris-related image being maintained for a preset time (predetermined time). Specifically, in the state where the iris-related image 310b is output in the image 300, the controller 180 may capture the image 300 in response to a movement (or change) of the iris-related image 310b not being detected for a preset time (predetermined time) (or the main body 100 not being moved for a preset time (predetermined time). The preset or predetermined time may be determined by a user setting or the control of the controller. For example, the preset time may be a time required to recognize the iris-related image in the image received through the camera.

Also, as illustrated in the second drawing of FIG. 10, the output position of the image 300 may be maintained even when the main body 100 is tilted. More specifically, the controller 180 may not change the output area of the image 300 even if the main body 100 is tilted. Accordingly, in the present invention, even when the main body 100 is tilted, the output position of the image 300 can be maintained, so as to capture the image 300 by rotating only the iris-related image included in the image 300.

With the configuration of the present invention, an image can be captured every time the main body is tilted to correspond to preset tilts in a state where an iris-related image is output in the image, so as to induce the iris-related image to be captured by being rotated, namely, iris-related images to be different from one another. This may result in capturing a plurality of iris-related images different from one another. In addition, according to the present invention, different iris-related images can be captured and prestored. Accordingly, even if states of iris-related images included in images received through the camera change due to surrounding environments or user's postures upon scanning the iris, iris recognition (or user authentication) can be performed by using the different iris-related images, thereby remarkably improving an iris recognition rate (or a user authentication rate).

Hereinafter, description will be given in more detail of a method of capturing a plurality of different iris images to be compared upon iris recognition according to the present invention, with reference to the accompanying drawings.

Figure 11A:
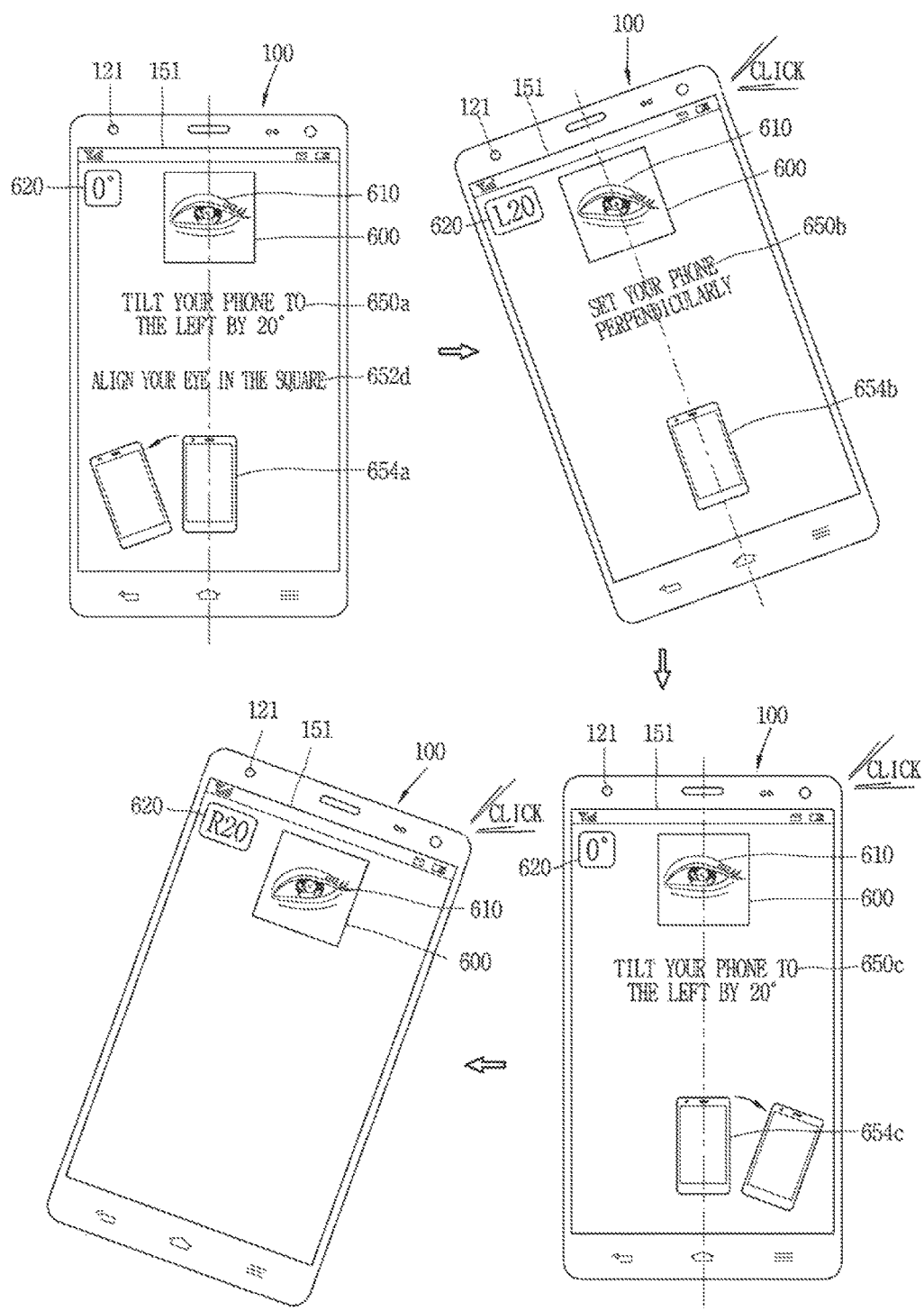
FIGS. 11A, 11B, and 12 are conceptual views illustrating a method of acquiring different iris-related images in accordance with another embodiment of the present invention.
Figure 11B:
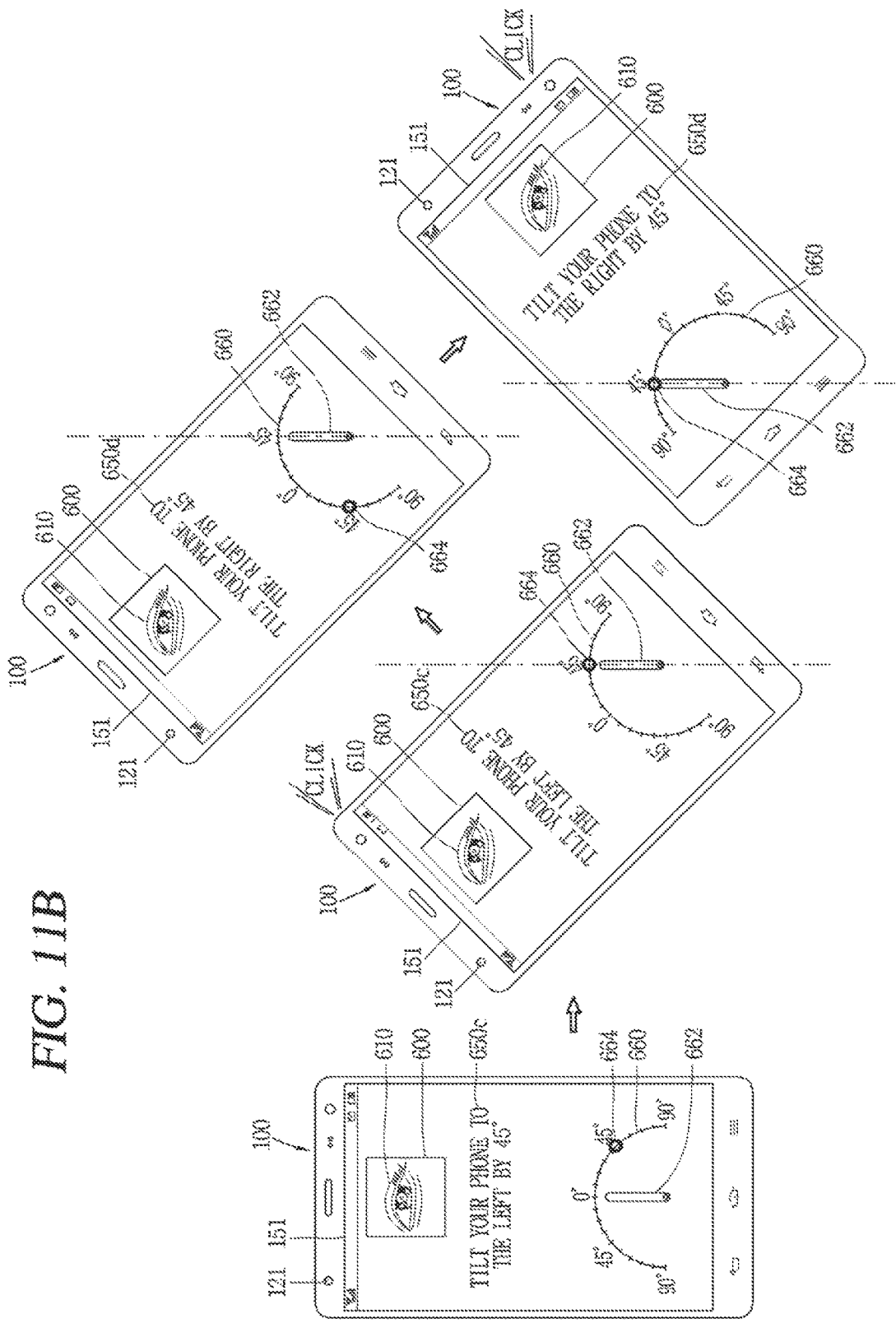
Figure 12:
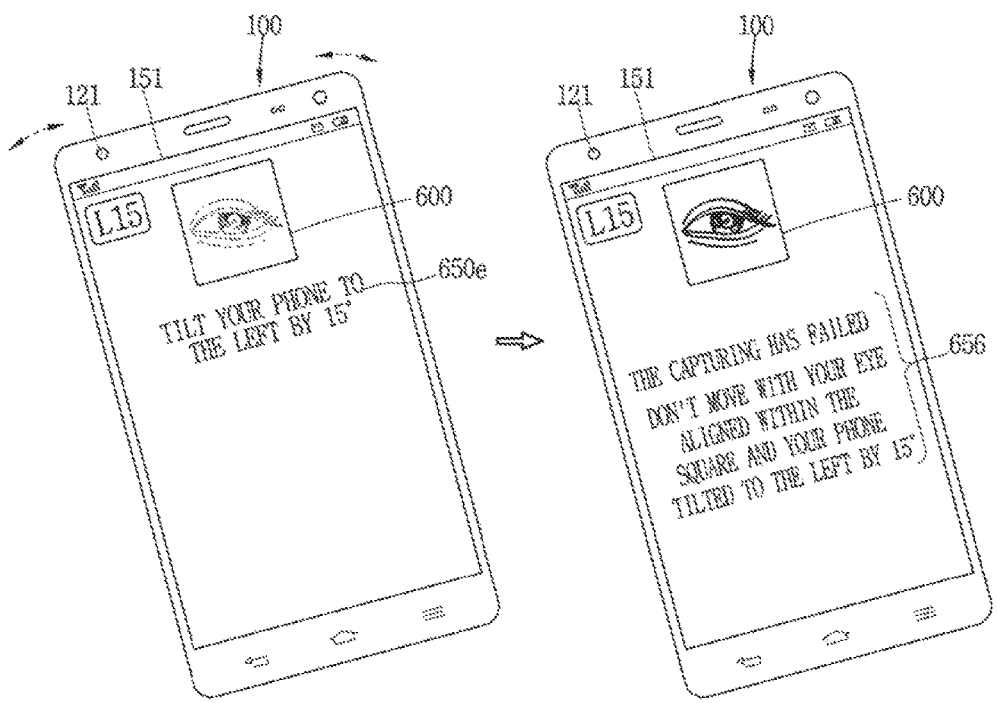

FIGS. 11A, 11B, and 12 are conceptual views illustrating a method of acquiring different iris-related images in accordance with to another embodiment of the present invention.

As illustrated in a first drawing of FIG. 11A, an image 600 received through the camera 121 may be displayed in a partial area of a display area of the display unit 151. The controller 180 may output on the display unit a graphic object 620 guiding a tilted degree of the main body, and notification information 650, 652, and 654a notifying conditions under which the capturing is performed.

The controller 180 may capture the image 600 every time the main body is tilted to correspond to preset tilts in a state where an iris-related image is output in the image 600.

In FIG. 11A, it is assumed that the preset tilts are 20° to the left, perpendicular) (0°, and 20° to the right. The perpendicular tilt (0°) refers to a state in which an angle between a virtual line corresponding to a lengthwise direction of the main body and a virtual line corresponding to a gravitational direction is 0°, namely, a state where the main body is vertically erected.

In response to an entrance into an iris registration step, the controller 180 may output on the display unit 151 information 650a, 652, and 654a for performing capturing, as illustrated in a first drawing of FIG. 11A.

Afterwards, as illustrated in a second drawing of FIG. 11A, in a state where the iris-related image 610 is output in the image 600, the controller 180 may capture the image 600, in response to the main body 100 being tilted to correspond to a preset first tilt (e.g., the main body 100 being tilted by 20° to the left). At this time, information (tilt information, angle information, etc.) indicating the tilted degree of the main body may be displayed on the graphic object 620 that guides the degree of tilt of the main body.

When the image 600 is captured, the controller 180 may output information 650b and 654b on the display unit 151 to inform the user of conditions for performing next capturing.

For example, the controller 180 may change at least some (650a and 654a) of the information 650a, 652, and 654a notifying the conditions for performing first capturing into the information 650b and 654b.

Afterwards, as illustrated in a third drawing of FIG. 11A, in the state where the iris-related image 610 is output in the image 600, the controller 180 may capture the image 600, in response to the main body 100 being tilted to correspond to a second tilt different from the first tilt (e.g., the main body 100 being erected perpendicularly) (0°).

Similarly, when the image 600 is captured, the controller 180 may output information 650c and 654c on the display unit 151 to inform conditions for performing the next capturing. For example, the controller 180 may change the information 650b and 654b informing conditions for performing second capturing to the information 650c and 654c informing conditions for performing third capturing.

Similarly, as illustrated in a fourth drawing of FIG. 11A, when the iris-related image is displayed in the image 600, the controller 180 may capture the image 600, in response to the main body 100 being tilted to correspond to a third tilt different from the second tilt (e.g., the main body being tilted by 20° to the right).

With this configuration, the present invention may acquire an image that the iris-related image is rotated to the right by 20°, an image that the iris-related image is horizontal to a ground direction, and an image that the iris-related image is rotated to the left by 20°. Here, a tilted degree of the iris-related image may be defined based on a virtual line which connects at least two points of the iris-related image (an image corresponding to the user's eye). For example, the two points may correspond to a point corresponding to dacryocyst and a tail of the eye.

Meanwhile, in the present invention, a graphic object for informing the tilted degree of the main body, and information for informing conditions for performing capturing may be output in various ways.

In FIG. 11B, it is assumed that preset tilts are 45° to the left and 45° to the right.

As illustrated in a first drawing of FIG. 11B, the display unit 151 may output thereon notification information (tilt information) 650c for notifying conditions for performing capturing, and a first graphic object 670 and a second graphic object 662 for guiding a tilted degree of the main body. The first graphic object 670 may have a shape of a protractor and may include scale information indicating angles. In addition, an output manner and an output position of the first graphic object 670 may not change even if the main body is tilted.

On the other hand, at least one of an output manner and an output position of the second graphic object 662 may change based on tilting of the main body 100. For example, when the main body 100 is tilted by a predetermined angle in one direction, the second graphic object 662 may be output by being rotated by the predetermined angle in a direction opposite to the one direction. For example, as illustrated in a second drawing of FIG. 11B, when the main body 100 is tilted by 45° to the left, the second graphic object 662 may be output by being tilted by 45° to the right opposite to the left side. That is, the second graphic object 662 may be displayed so as to correspond to a virtual line matched with the gravitational direction even though the main body 100 is tilted.

Also, an icon 664 may be output on the first graphic object 670 to correspond to an angle indicating a tilt (a preset tilt) at which capturing is performed. For example, when the tilt is 45° to the left, the icon 664 may be displayed at a position corresponding to 45° to the right, as illustrated in a first drawing of FIG. 11B. This is because the second graphic object 662 is output by being rotated to the right when the main body 100 is tilted to the left.

Here, capturing the image in response to the main body 100 being tilted to correspond to a preset tilt while the iris-related image is output in the image 600 may be understood as capturing the image 600 in response to the second graphic object 662 being rotated by the tilting of the main body 100 so as to point at the icon 664.

For example, as illustrated in the first and second drawings in FIG. 11B, when the main body is tilted in the state that the iris-related image is output in the image 600 received through the camera 121, the controller 180 may rotate the second graphic object 662. The controller 180 may then capture the image 600 when the second graphic object 662 points at the icon 664 guiding the preset tilt.

When the capturing is performed, as illustrated in a third drawing of FIG. 11B, the controller 180 may change an output position of the icon 664 to point at an angle corresponding to a tilt (a preset tilt) at which next capturing is to be performed.

Afterwards, as illustrated in a fourth drawing of FIG. 11B, when the main body 100 is tilted while the iris-related image is output in the image 600, the controller 180 may capture the image 600 in response to the second graphic object 662 pointing at the icon 664 of which output position has been changed.

In addition, the controller 180 may variously output a graphic object indicating a tilted degree of the main body and notification information notifying conditions for performing capturing.

On the other hand, even if the main body 100 is tilted so as to correspond to a preset tilt, when the iris-related image is not output in the image or a movement of the main body 100 is detected, the controller 180 may not capture the image. When the iris-related image is not output in the image or the movement of the main body 100 is detected, the controller 180 may output notification information on the display unit 151 to notify conditions necessary for performing the capturing.

For example, as illustrated in a first drawing of FIG. 12, when a preset tilt is 15° to the left, the controller 180 may not perform capturing when the movement of the main body 100 is detected even though the main body 100 is tilted to correspond to the preset tilt while the iris-related image is output in the image received through the camera 121. In addition, the controller 180 may not perform the capturing even when the iris-related image output in the image, other than the main body 100, moves (i.e., when a subject corresponding to the eye moves).

Thereafter, the controller 180, as illustrated in a second drawing of FIG. 12, may output notification information 656 to notify conditions necessary for performing capturing.

On the other hand, in the present invention, an image received through the camera may be captured based on various conditions. Hereinafter, an image capturing method (an iris registering method) according to another embodiment of the present invention will be described in more detail with reference to the accompanying drawings.

Figure 13A:
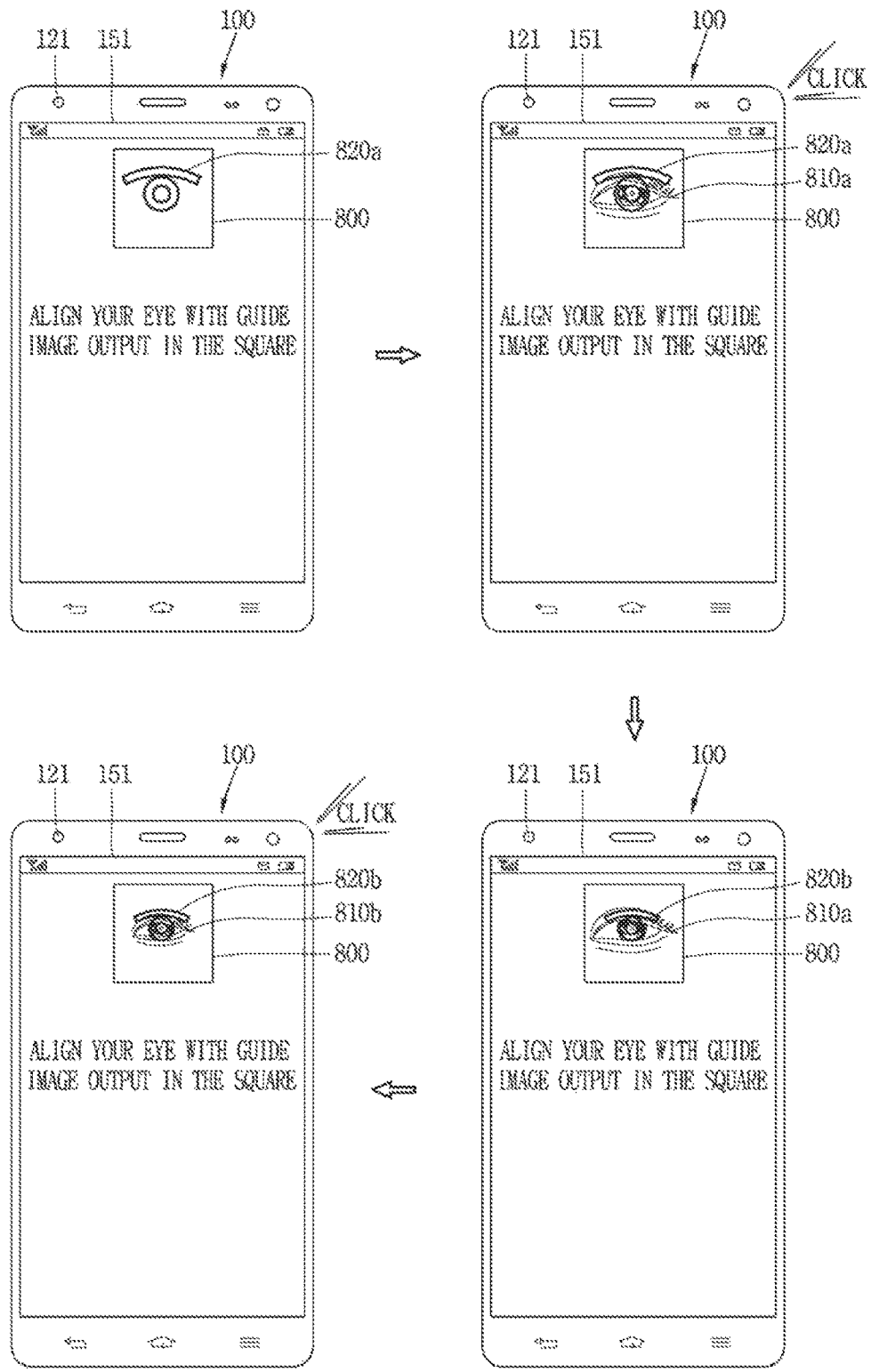
FIGS. 13A and 13B are conceptual views illustrating a method of acquiring different iris-related images in accordance with another embodiment of the present invention.
Figure 13B:
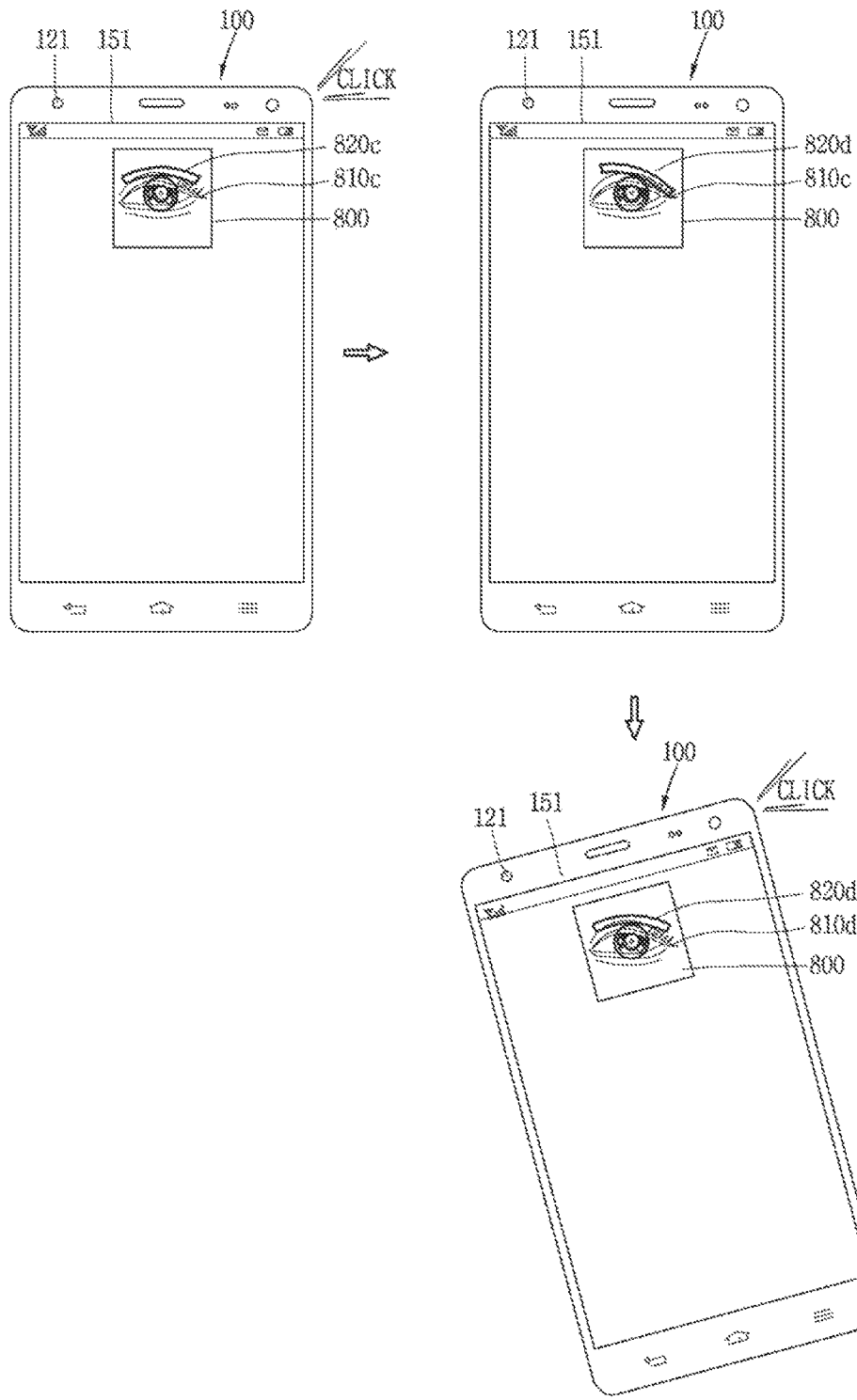

FIGS. 13A and 13B are conceptual views illustrating a method of acquiring different iris-related images in accordance with another embodiment of the present invention.

Referring to FIG. 13A, the controller 180 may overlap a guide image 820a, which guides a position at which an iris-related image is to be output, with an image 800 received through the camera 121. The controller 180 may then capture the image 800 based on that an iris-related image 810a corresponds to (is aligned with) the guide image 820a.

In addition, the controller 180 may change at least one of an output size and an output angle of the guide image (change 820a to 820b), in response to the image 800 being captured, such that different images related to the iris (different iris-related images) can be captured.

The controller 180 may then capture the image 800 in response to the iris-related image 810a corresponding to (being aligned with) the changed guide image 820a.

At this time, the iris-related images 810a and 810b may be different from each other. This is because the image 800 is captured in response to the iris-related image being aligned with the guide image, and the guide image is changed after capturing.

For example, when entering an iris registration step, as illustrated in a first drawing of FIG. 13A, the controller 180 may output the image 800 received through the camera in a partial area of a display area of the display unit, and output the guide image 820a, which guides the position where the iris-related image is to be output, on at least part of the image 800 in an overlapping manner.

Thereafter, the controller 180 may capture the image 800 when the iris-related image 810a is output in the image 800 due to the user's movement and the iris-related image 810a is aligned with the guide image 820a.

Here, the fact that the iris-related image 810a corresponds to (is aligned with) the guide image 820a, for example, may include the fact that an image with respect to a pupil included in the image is aligned with a circle image included in the guide image, the fact that at least two points of the iris-related image (e.g., a point corresponding to dacryocyst and another point corresponding to a tail of the eye) are aligned with two preset points of the guide image, and the like.

When the capturing is performed, the controller 180 may change an output size of the guide image 810a. For example, as illustrated in a third drawing of FIG. 13A, the controller 180 may reduce the output size of the guide image 820a in response to the image 800 being captured. When the iris-related image 810b included in the image 800 is aligned with the reduced guide image 820b while the reduced guide image 820b is output in the image 800, the controller 180 may capture the image 800, as illustrated in a fourth drawing of FIG. 13A. In this case, for example, the user may move the main body away from his/her eyes so that the output size of the iris-related image 810b included in the image can be reduced.

As another example, as illustrated in a first drawing of FIG. 13B, the controller 180 may capture an image when an iris-related image 810c included in the image is aligned with the guide image 820c, and, as illustrated in a second drawing of FIG. 13B, may rotate the guide image 820c (820d). As illustrated in a third drawing of FIG. 13B, when an iris-related image 810d is aligned with the rotated guide image 820d, the controller 180 may capture the image 800. For example, the user may allow the iris-related image 810d to be aligned with the rotated guide image 820d in various ways, such as tilting the main body 100, or heading down in a fixed state of the main body 100.

At this time, even if the image 800 is captured, the captured image may not include the guide image.

The configurations described with reference to FIGS. 9 to 13B may be applied in the same/like manner not only to the iris registration step but also to the iris recognition step for the iris recognition.

With this configuration, in the present invention, the different iris-related images can be obtained by changing the output size of the guide image or rotating the guide image.

As described above, according to the present invention, a plurality of iris-related images used for iris recognition can be captured, and the plurality of iris-related images can be different from one another. Accordingly, the present invention can improve an iris recognition rate by performing the iris recognition using such different iris-related images.

In addition, the present invention can provide UIs/UXs capable of capturing different iris-related images in an optimized manner.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
  a camera;
  a display unit configured to output an image received through the camera; and a controller configured to:
output the image in a first area of a display area of the display unit and control the display unit to output the image in a preset manner;
output the image in a second area of the display area different from the first area in response to capturing of the image displayed in the first area such that different iris-related images are captured;
capture the image output in the first area as a first image;
in response to the capturing of the image displayed in the first area, change an output position of the image from the first area to the second area without moving the mobile terminal so as to induce a change of a user's gaze; and
capture the image output in the second area as a second image,
wherein the first image and the second image are the different iris-related images.

2. The terminal of claim 1, wherein an output size of the image is constantly maintained even if the output area of the image is changed.

3. The terminal of claim 1, wherein the capturing is performed in response to an iris-related image being recognized in the image.

4. The terminal of claim 3, wherein the controller performs the capturing, in response to the output of the iris-related image being maintained for a preset time while the iris-related image is output in the image.

5. The terminal of claim 3, wherein the controller outputs the image in another area, other than capturing the image, when the iris-related image recognized in the image satisfies a preset condition.

6. The terminal of claim 5, wherein the preset condition is a case where brightness of at least part of the iris-related image is higher than reference brightness.

7. The terminal of claim 1, wherein the controller outputs the image in a second output size different from a first output size when the image is captured while the image is output in the first output size.

8. The terminal of claim 1, wherein:
the capturing of the image is performed a preset number of times; and
the controller is further configured to change the output position of the image from one area of the display area to another area of the display area every time when the image is captured.

9. A method for controlling a mobile terminal, the method comprising:
outputting an image received through a camera in a first area of a display area of a display unit;
controlling the display unit to output the image in a preset manner;
outputting the image in a second area of the display area different from the first area in response to capturing of the image displayed in the first area such that different iris-related images are captured;
capturing the image output in the first area as a first image;
in response to the capturing the image displayed in the first area, changing an output position of the image from the first area to the second area without moving the mobile terminal so as to induce a change of a user's gaze; and
capturing the image output in the second area as a second image,
wherein the first image and the second image are the different iris-related images.

10. The method of claim 9, wherein:
the capturing of the image is performed a preset number of times; and
the output position of the image is changed from one area of the display area to another area of the display area every time when the image is captured.

* * * * *